(12) United States Patent
Usuda

(10) Patent No.: US 7,073,727 B2
(45) Date of Patent: Jul. 11, 2006

(54) DISCHARGE DEVICE, CONTROL METHOD THEREOF, DISCHARGE METHOD, METHOD FOR MANUFACTURING MICROLENS ARRAY, AND METHOD FOR MANUFACTURING ELECTROOPTIC DEVICE

(75) Inventor: Hidenori Usuda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 421 days.

(21) Appl. No.: 10/197,498

(22) Filed: Jul. 18, 2002

(65) Prior Publication Data

US 2003/0071138 A1 Apr. 17, 2003

(30) Foreign Application Priority Data

Jul. 23, 2001 (JP) ............................. 2001-222072
Feb. 26, 2002 (JP) ............................. 2002-050454
Jul. 3, 2002 (JP) ............................. 2002-195210

(51) Int. Cl.
*B05B 17/04* (2006.01)

(52) U.S. Cl. .............................. 239/4; 239/68; 239/69; 239/102.1; 239/102.2; 239/552; 239/556; 239/566; 347/10; 347/11; 347/14

(58) Field of Classification Search .................... 239/4, 239/102.1, 102.2, 68, 69, 548, 566, 556, 239/557, 533.1, 390, 391, 552, 596; 347/10, 347/11, 14, 23, 40, 54, 55, 57
See application file for complete search history.

(56) References Cited

U.S. PATENT DOCUMENTS 6,328,395 B1 * 12/2001 Kitahara et al. ............... 347/9
6,488,349 B1    12/2002 Matsuo et al.
6,530,636 B1 *  3/2003 Asauchi ........................ 347/14
6,629,741 B1 * 10/2003 Okuda et al. ................. 347/11
6,719,211 B1 *  4/2004 Takeuchi et al. ......... 239/102.2
6,783,210 B1 *  8/2004 Takahashi et al. ............ 347/57
6,824,083 B1 * 11/2004 Okuda et al. ............... 239/548
6,824,238 B1 * 11/2004 Chang ......................... 347/10
6,827,423 B1 * 12/2004 Katakura et al. ............. 347/40

FOREIGN PATENT DOCUMENTS

| CN | 1320081 A    | 10/2001 |
| JP | A-10-138475  | 5/1998  |
| JP | A-2001-38892 | 2/2001  |
| JP | A-2001-121722 | 5/2001 |
| JP | A-2001-162840 | 6/2001 |

* cited by examiner

*Primary Examiner*—Steven J. Ganey
(74) *Attorney, Agent, or Firm*—Oliff & Berridge, PLC

(57) ABSTRACT

The invention provides a discharge device which forms microlenses, etc., with high precision. A switch circuit selects a predetermined one of drive pulses included in a drive signal on the basis of waveform selection data obtained from a control device, and applies the selected drive pulse.

18 Claims, 19 Drawing Sheets

(A)

(B)

| GROUP / NOZZLE ID VH | GROUP 1 | | | GROUP 2 | | | GROUP 3 | | |
|---|---|---|---|---|---|---|---|---|---|
| | ID1 | ID2 | ID3 | ID4 | ID5 | ID6 | ID7 | ID8 | ID9 |
| 19.2 | 8.4 | 8.6 | 8.8 | 9.0 | 9.2 | 9.4 | 9.6 | 9.8 | 10.0 |
| 19.4 | 8.6 | 8.8 | 9.0 | 9.2 | 9.4 | 9.6 | 9.8 | 10.0 | 10.2 |
| 19.6 | 8.8 | 9.0 | 9.2 | 9.4 | 9.6 | 9.8 | 10.0 | 10.2 | 10.4 |
| 19.8 | 9.0 | 9.2 | 9.4 | 9.6 | 9.8 | 10.0 | 10.2 | 10.4 | 10.6 |
| 20.0 | 9.2 | 9.4 | (9.6) | 9.8 | (10.0) | 10.2 | 10.4 | 10.6 | 10.8 |
| 20.2 | 9.4 | 9.6 | 9.8 | 10.0 | 10.2 | 10.4 | 10.6 | 10.8 | 11.0 |
| 20.4 | 9.6 | (9.8) | (10.0) | 10.2 | 10.4 | 10.6 | 10.8 | 11.0 | 11.2 |
| 20.6 | 9.8 | 10.0 | 10.2 | 10.4 | 10.6 | 10.8 | 11.0 | 11.2 | 11.4 |
| 20.8 | 10.0 | 10.2 | 10.4 | 10.6 | 10.8 | 11.0 | 11.2 | 11.4 | 11.6 |

DISCHARGE DEVICE, CONTROL METHOD THEREOF, DISCHARGE METHOD, METHOD FOR MANUFACTURING MICROLENS ARRAY, AND METHOD FOR MANUFACTURING ELECTROOPTIC DEVICE

TECHNICAL FIELD

The present invention relates to a discharge device which discharges viscous liquid such as resin, a method for controlling the discharge device, a discharge method using the discharge device, and methods for forming a microlens array, a color filter substrate, and an electrooptic device using the discharge method.

BACKGROUND ART

In liquid crystal displays, microlens arrays are used for efficiently utilizing incident light in a pixel area. Such microlens arrays are generally manufactured by applying a photosensitive resin on a transparent substrate by spin coating and forming a pattern by using photolithography techniques. However, if, for example, microlenses are formed by discharging a transparent resin (viscous liquid) in a matrix pattern by using a discharge method used in inkjet printers, inkjet plotters, etc., and curing the transparent resin, the efficiency in producing the microlens arrays is largely increased.

Microlens arrays are also used in optical interconnection devices which connect chips with light, and, also in this case, the efficiency in producing the microlens arrays can be largely increased when the microlenses are formed by discharging a transparent resin in a matrix pattern by using the above-described discharge method and curing the transparent resin. Since it is not necessary to prepare a mold or perform post processing, the above-described discharge method is suitable for manufacturing various kinds of optical components.

In addition, in color filter substrates of liquid crystal devices, color layers are generally formed by using photolithography techniques. However, if they are also formed by the above-described discharge method, the efficiency in producing the color filter substrates can also be increased.

Furthermore, recently, organic electroluminescent devices using fluorescent organic compounds have been attracting attention. Generally, in the manufacturing process of organic electroluminescent devices, a fluorescent organic compound layer is formed at a predetermined region by partial deposition using a metal mask. Accordingly, it has been difficult to increase the precision, the area, and the production efficiency. However, if the fluorescent organic compound layer is also formed by the above-described discharge method, the precision, the area, and the production efficiency are increased.

DISCLOSURE OF INVENTION

In microlens arrays, the lens characteristics of the microlenses are required to be uniform. However, when a discharge device is constructed such that all of pressure-generating elements, which are each provided for one nozzle, receive the same drive signal, the weight, the discharge speed, etc., of the viscous liquid discharged from each nozzle differ in accordance with the position of the nozzle, and this is unavoidable due to the structure of a head. Accordingly, there is a problem in that the viscous liquid cannot be discharged uniformly and a microlens array including microlenses having a uniform shape, a color filter substrate having stable characteristics, or an organic electroluminescent device having stable characteristics cannot be obtained.

For example, in a head having a plurality of nozzles, the weight, the discharge speed, etc., of the viscous liquid discharged from nozzles arranged along the same line differ in accordance with the position of the nozzle. This difference is caused according to the method of adhering a pressure-generating element array on the housing of the head, differences in rigidities of each part of the housing of the head, etc. In addition, the weight, the discharge speed, etc., of the viscous liquid discharged from nozzles which belong to different lines also differ in accordance with the position of the nozzle since the amount of heat generation, etc., differs in accordance with the position at which the pressure-generating array is adhered on the housing of the head. Such variation in the amount of discharge which occurs in the discharge device due to the above-described reasons can be somewhat avoided by not using heads in which the variation in the same line or between different lines exceeds a limit. However, in such a case, a reduction in yield of the head in a testing process is unavoidable. In addition, there may be a case in which heads are exchanged in the same discharge device.

In view of the above-described situation, an object of the present invention is to provide a discharge device and a discharge method by which microlenses, for example, can be formed with high precision, and to provide methods for manufacturing a microlens array, a color filter substrate, and an electrooptic device using the discharge method.

In order to solve the above-described problem, according to the present invention, a discharge device for discharging viscous liquid toward a target includes a head having a plurality of pressure-generating elements, each of which corresponds to a nozzle; drive-signal generating means which generates a drive signal including a plurality of drive pulses; control means which outputs waveform selection data defining which of the drive pulses is to be applied to the pressure-generating elements; and switching means which selects a predetermined drive pulse from the drive pulses and applies the selected drive pulse to the pressure-generating elements.

According to the present invention, the switching means selects a predetermined drive pulse from a common drive signal on the basis of the waveform selection data obtained from the control means and applies the selected drive pulse to the pressure-generating elements. Accordingly, the variation in weight of the viscous liquid between the nozzles can be corrected. Thus, when the viscous liquid is discharged form each of the nozzles, the weigh corresponding to a single dot formed by the viscous liquid does not vary between the nozzles. Therefore, the viscous liquid can be discharged with high precision.

In addition, according to the present invention, different cycles of the drive signal may include different drive pulses. In such a case, the variation in weight of the viscous liquid can be further reduced.

In the process of discharging the viscous liquid toward the target, a period including a plurality of cycles of the drive signal may be set as an operational unit of discharging the viscous liquid.

Preferably, in the process of discharging the viscous liquid toward the target, a time position of a predetermined cycle with respect to a predetermined first cycle of the drive signal is adjustable by using the first cycle of the drive signal as a unit.

In addition, according to the present invention, in the process of discharging the viscous liquid toward the target, one of the pressure-generating elements receives the drive pulse in a single cycle of the drive signal.

Alternatively, in the process of discharging the viscous liquid toward the target, one of the pressure-generating elements may receive the drive pulse in a plurality of cycles of the drive signal.

According to the present invention, the drive pulses have waveforms for discharging the viscous liquid by different weights, and the switching means selects one of the drive pulses on the basis of the waveform selection data and applies the selected drive pulse to a predetermined one of the pressure-generating elements.

Alternatively, the switching means may select two or more of the drive pulses, which have waveforms for discharging the viscous liquid by different weights, on the basis of the waveform selection data and applies the selected drive pulses to a predetermined one of the pressure-generating elements.

According to the present invention, the control means includes, for example, a storage unit which stores nozzle data corresponding to variation in weight of the viscous liquid discharged from each of the heads when drive pulses having the same waveform are applied to the pressure-generating elements, and the control means generates the waveform selection data on the basis of the nozzle data stored in the storage unit, and outputs the waveform selection data.

In addition, according to the present invention, the heads are classified into a plurality of groups in accordance with the weights of the viscous liquid discharged when the drive pulses having the same waveform are applied to the pressure-generating elements, and the result of the classification is stored in the storage unit as the nozzle data.

Alternatively, the nozzle data may be stored in the storage unit for each of the heads.

According to the present invention, the head has the nozzle data regarding the heads formed in the head, and the nozzle data is input to the storage unit from a head testing device which measures the variation in weight.

A method for controlling a discharge device according to the present invention includes a first step in which the viscous liquid is discharged by using a first drive pulse and a second step in which the first drive pulse is corrected based on a result of measurement of the weight of the discharged viscous liquid.

In this method for controlling the discharge device, the first step and the second step may be repeated until the weight of the viscous liquid discharged from each nozzle of the discharge device becomes approximately uniform.

In addition, according to the present invention, a method for controlling a discharge device which discharges viscous liquid includes a first step in which, if the weight of the viscous liquid discharged when a drive pulse having a reference waveform is applied is different from a desired weight, a waveform with which the desired weight is obtained is determined; a second step in which a drive signal having the determined waveform is applied to the pressure-generating element and the weight of the discharged viscous liquid measured; and a third step in which the measured weight and the desired weight are compared and the nozzle data is fixed if the measured weight is the same as the desired weight, and the first step, the second step, and the third step are repeated if the measured weight is different from the desired weight.

In this case, preferably, an upper limit for the number of repetitions of the first step, the second step, and the third step is set in advance, and it is determined that the head is not up to standard if the nozzle data cannot be fixed even when the first step, the second step, and the third step are repeated the number of times corresponding to the upper limit.

The discharge device according to the present invention may be used in a manufacturing process of a microlens array in which a resin for forming a plurality of microlenses, which serves as the viscous liquid, is discharged toward a substrate which serves as the target.

In addition, a method for manufacturing an electrooptic device according to the present invention includes a step of discharging a resin for forming a color filter, which serves as the viscous liquid, toward a substrate which serves as the target.

In addition, the discharge method according to the present invention may also be used in a manufacturing process of an electrooptic device wherein a liquid containing an electrooptic material, which serves as the viscous liquid, is discharged toward a substrate which serves as the target. The electrooptic material may be a liquid crystal, a fluorescent organic compound for generating electroluminescence, etc.

According to the present invention, a switch circuit selects a predetermined drive pulse from a common drive signal on the basis of the waveform selection data obtained from the control means and applies the selected drive pulse to the pressure-generating elements. Accordingly, the variation in weight of the viscous liquid between the nozzles can be corrected. Thus, when the viscous liquid is discharged form each of the nozzles, the weigh corresponding to a single dot formed by the viscous liquid does not vary between the nozzles. Therefore, microlenses, etc., can be formed with high precision.

BRIEF DESCRIPTION OF THE DRAWINGS

FIG. 1 is a schematic perspective view showing the overall construction of a discharge device according to a first embodiment of the present invention.

FIG. 2 is a functional block diagram of the discharge device shown in FIG. 1.

FIG. 3 is an exploded perspective view showing the construction of a head included in the discharge device shown in FIG. 1.

FIG. 4 is an explanatory diagram of the head 10, wherein (A) is a sectional view of an actuator formed in the head shown in FIG. 3 and (b) is a basic waveform of a drive signal applied to a pressure-generating element used in the actuator shown in (a).

FIG. 5 is a block diagram showing the construction of the drive-signal generating unit 48.

FIG. 6 is an explanatory diagram showing a process in which a drive pulse included in the drive signal COM is generated in the drive-signal generating unit 48.

FIG. 7 is a timing chart showing the timing of signals used in the process of setting a potential difference in a memory by using a data signal in the drive-signal generating unit 48.

FIG. 8 is an explanatory diagram showing a waveform of a common drive signal COM used in the discharge device 1 according to the first embodiment of the present invention, the relationship between the drive pulse in the drive signal COM applied to the pressure-generating element 17 and the dot size of the viscous liquid discharged from a corresponding nozzle 211, and a method of selecting one of the drive pulses from the drive signal COM on the basis of discharge data SI and applying it to the pressure-generating element 17.

FIG. 10 is a flowchart showing a process of determining nozzle data for each of the heads.

[FIG. 11] FIG. 11 is an explanatory diagram of a table used in the process of determining the nozzle data shown in FIG. 10.

FIG. 12 is an explanatory diagram showing a waveform of a drive signal used in the discharge device according to another embodiment of the present invention.

FIG. 13 is an explanatory diagram showing an example of a waveform of a drive signal COM where pulses are changed at each cycle of the drive signal COM.

FIG. 14 is an explanatory diagram showing a first example of a microlens array.

FIG. 15 is an explanatory diagram showing a second example of a microlens array.

FIG. 16 is a schematic sectional view showing the construction of a liquid crystal device including a color filter substrate.

FIG. 18 is a schematic sectional view showing the construction of an organic electroluminescent device forming each pixel in an organic electroluminescent display.

FIG. 19 is a sectional view showing a part of another construction of an organic electroluminescent device forming each pixel in an organic electroluminescent display.

REFERENCE NUMERALS

1: discharge device, 1A: main body, 1B: computer (control means), 2: X-direction drive motor, 3: Y-direction drive motor, 4: X-direction drive shaft, 5: Y-direction guide shaft, 6: head-moving mechanism, 7: stage, 8: cleaning mechanism, 9: base, 10: head, 11: head-driving circuit, 40: control device, 43: interface, 44: RAM, 45: ROM, 48: drive-signal generating unit, 49: interface, 100A and 100B: microlens array, CLK: clock signal, COM: drive signal, COM1 to COM8: drive pulse, D: microlenses, SI: discharge data, W: target

BEST MODE OF CARRYING OUT THE INVENTION

Embodiments of the present invention will be described in detail below with reference to the accompanying drawings.

[Overall Construction of Discharge Device]

Figure 1:
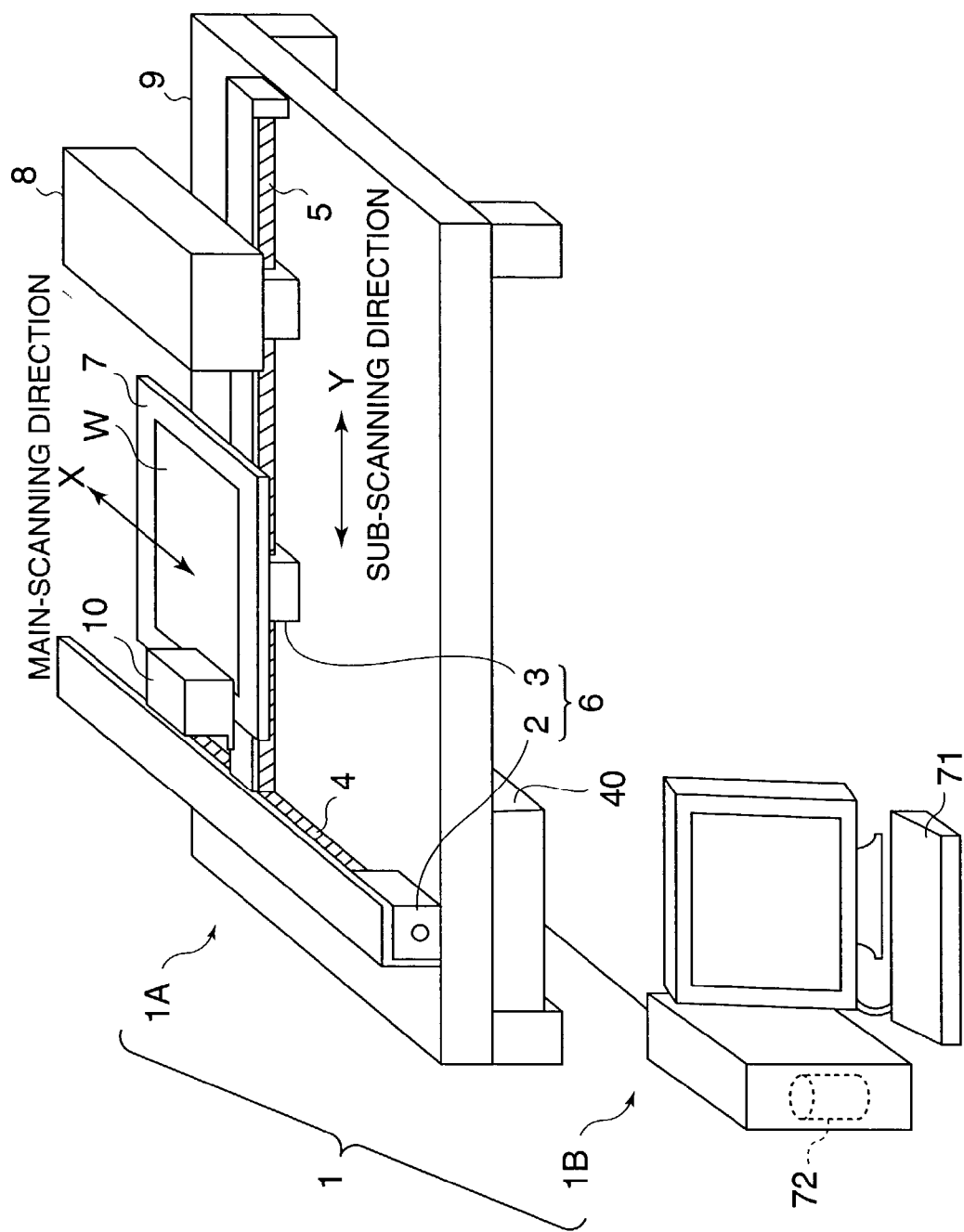
[FIG. 1]
Figure 2:
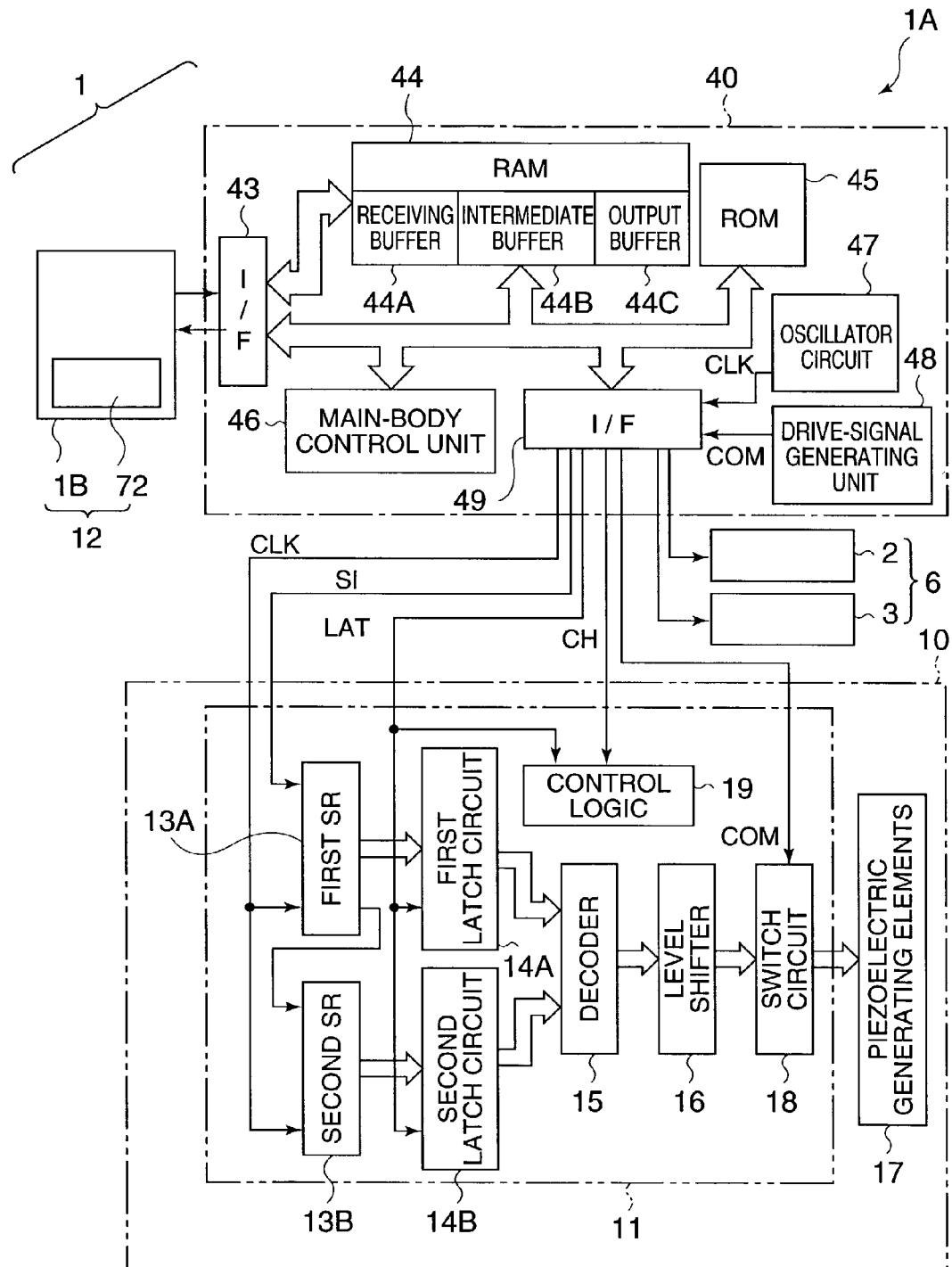
[FIG. 2]

FIG. 1 is a schematic perspective view showing the overall construction of a discharge device according to a first embodiment of the present invention, and FIG. 2 is a functional block diagram of the discharge device shown in FIG. 1. As shown in FIG. 1, a discharge device 1 according to the present embodiment includes a main body 1A which is, for example, an inkjet discharge device, and a computer 1B.

The main body 1A includes a head 10, an X-direction drive shaft 4, an X-direction drive motor 2, a Y-direction guide shaft 5, a Y-direction drive motor 3, a control device 40, a stage 7, a cleaning mechanism 8, and a base 9. The computer 1B includes a keyboard 71 with which discharge conditions such as positions on a target W at which viscous liquid is to be discharged in the main body 1A can be input, and a storage unit 72 which stores and preserves the discharge conditions input with the keyboard 71 or from a recording medium such as a FD. An operation of selecting from the discharge conditions stored in the storage unit 72 can be performed by using, for example, the keyboard 71. In addition, as described below, the storage unit 72 also stores nozzle data which is used for correcting variation in the discharge weight between nozzles formed in the head 10.

The nozzle data is provided for each head 10 individually. When the discharge device 1 is assembled, the worker inputs the nozzle data corresponding to the head 10 into the storage unit 72 by using, for example, the keyboard 71. In addition, when a barcode for the nozzle data is shown on the head 10, the nozzle data may be optically read out and stored in the storage unit 72. Alternatively, since the nozzle data is obtained by discharging the viscous liquid from each of the heads formed in the head 10 and measuring the weight thereof, as described below, the nozzle data may be directly input to the storage unit 72 from a head-testing device (not shown) which measures the weight variation to obtain the nozzle data.

In the main body 1A, the head 10 receives the viscous liquid, for example, resin, from a tank (not shown) via a pipe (liquid supply paths, and discharges the viscous liquid through nozzles formed in the head 10. In the present embodiment, resin or the like is used as the viscous liquid. Since the viscosity of resin is considerably higher than that of ink used in printers or the like, the tank, the pipe, and the head 10 according to the present embodiment have heaters (not shown) for heating the viscous liquid and reducing the viscosity thereof. According to the present invention, the viscous liquid is not limited to those having a high viscosity, and may be, for example, ink, liquid containing metal particles, etc.

The stage 7 is used for supporting a substrate W, that is, the target toward which the viscous liquid is discharged, and includes a mechanism for fixing the substrate W at a predetermined reference position. The X-direction drive shaft 4 is constructed of a ball screw or the like and the X-direction drive motor 2 is connected to the X-direction drive shaft 4 at an end thereof. The X-direction drive motor 2 is, for example, a stepping motor, and rotates the X-direction drive shaft 4 when a drive signal for the X-direction movement is supplied from the control device 40. When the X-direction drive shaft 4 rotates, the head 10 moves in the X direction on the X-direction drive shaft 4.

The Y-direction guide shaft 5 is also constructed of a ball screw or the like, and is fixed on the base 9 at a predetermined position. The stage 7 is placed on the Y-direction guide shaft 5, and the stage 7 includes the Y-direction drive motor 3. The Y-direction drive motor 3 is, for example, a stepping motor, and the stage 7 moves in the Y direction while being guided by the Y-direction guide shaft 5 when a drive signal for the Y-direction movement is supplied from the control device 40. Accordingly, a head-moving mechanism 6 which moves the head 10 to an arbitrary position above the substrate W is constructed of the X-direction drive motor 2 and the Y-direction drive motor 3.

With reference to FIG. 2, the control device 40 of the main body 1A includes an interface 43 which receives the discharge conditions, etc., from the computer 1B, a RAM 44 which records various data, a ROM 45 which stores a routine for processing the data, etc., a main-body control unit 46 including a CPU, etc., an oscillator circuit 47, a drive-signal generating unit 48 which generates a drive signal COM supplied to the head 10, and an interface 49. The interface 49 outputs discharge data which is expanded into dot-pattern data to the head 10, and the drive signals to the X-direction drive motor 2 and the Y-direction drive motor 3 of the head-moving mechanism 6.

In the above-described discharge device 1, the main-body control unit 46 and the computer 1B function as control means 12 for the overall system of the discharge device 1, as described below. The discharge conditions transmitted from the computer 1B are received by a receiving buffer 44A in the discharge device 1 via the interface 43. The data held in the receiving buffer 44A is transmitted to an intermediate buffer 44B after being subjected to a command analysis. In the intermediate buffer 44B, the data is converted into an intermediate code by the main-body control unit 46, and information such as positions for discharging the viscous liquid is added by the main-body control unit 46. Next, the main-body control unit 46 analyzes and decodes the data-held inside the intermediate buffer 44B, and expands and records the dot-pattern data in an output buffer 44C.

When dot-pattern data corresponding to a single scan of the head 10 is obtained, it is serially transmitted to the head 10 via the interface 49. When the dot-pattern data corresponding to a single scan is-output from the output buffer 44C, the intermediate buffer 44B is cleared and the subsequent intermediate-code conversion is performed.

The head 10 discharges the viscous liquid from each nozzle, which will be described below, at predetermined timing. The drive signal COM generated by the drive-signal generating unit 48 is output to the head 10 via the interface 49. In addition, the discharge data SI expanded into the dot-pattern data is serially output to a head-driving circuit 11, which is included in the head 10, via the interface 49 in synchronization with a clock signal CLK obtained from the oscillator circuit 47. The discharge data SI expanded into the dot-pattern data includes nozzle-selection data defining which of the nozzles formed in the head 10 are to be used for discharging the viscous liquid, and waveform selection data defining which drive pulse is to be used for discharging the viscous liquid from each nozzle.

The head-driving circuit 11 includes a first shift resistor 13A, a second shift resistor 13B, a first latch circuit 14A, a second latch circuit 14B, a decoder 15, a level shifter 16, a switch circuit 18 (switching elements 18-1, 18-2, ..., 18-N), and a control logic 19. In the switch circuit 18, the switching elements 18-1, 18-2, ..., 18-N are connected to piezoelectric transducers which are used as pressure-generating elements 17 (17-1, 17-2, ..., 17-N), respectively, at the output ends thereof.

In the head-driving circuit 11, the discharge data (SI) obtained from the control device 40 is serially transmitted to the first shift resistor 13A and the second shift resistor 13B, which serve as "serial/parallel converting means". Data including the high-order bits of the discharge data is input to the second shift resistor 13B, and data including the low-order bits of the discharge data is input to the first shift resistor 13A.

The shift resistors 13A and 13B are connected to the first latch circuit 14A and the second latch circuit 14B, respectively, which serve as "latch means". When a latch signal (LAT) is input from the main body 1A to each of the latch circuits 14A and 14B, the latch circuits 14A and 14B latch the discharge data SI output in parallel from the shift resistors 13A and 13B. More specifically, the first latch circuit 14A latches the data including the low-order bits of the discharge data SI, and the second latch circuit 14B latches the data including the high-order bits of the discharge data SI. Each of the unit including the first shift resistor 13A and the first latch circuit 14A and the unit including the second shift resistor 13B and the second latch circuit 14B forms a "memory circuit", and "memory means" is constructed of these two memory circuits.

The discharge data SI latched by the latch circuits 14A and 14B is input to the decoder 15. The decoder 15 translates the 2-bit discharge data SI into 4-bit discharge data SI by using signals obtained from the control logic 19. Accordingly, "translating means" is constructed of the decoder 15 and the control logic 19. Then, the voltage of the discharge data SI translated by the decoder 15 is increased to a predetermined voltage which is enough to drive the switch circuit 18, for example, to several tens of volts, by the level shifter 16 which serves as a voltage amplifier. The discharge data SI whose voltage is increased to the predetermined value is applied to the switch circuit 18 which serves as "switching means". In the switch circuit 18, the drive signal COM transmitted from the drive-signal generating unit 48 is applied to the switching elements 18-1, 18-2, ..., 18-N, at the input ends thereof, and the pressure-generating elements 17 (17-1, 17-2, ..., 17-N) are connected at the output ends of the switching elements 18-1, 18-2, ..., 18-N, respectively.

The discharge data SI is used for controlling the switching elements 18-1, 18-2, ..., 18-N of the switch circuit 18 individually. For example, while the discharge data SI supplied to the switching elements 18-1, 18-2, ..., 18-N is "1", the drive signal COM is applied to the pressure-generating elements 17 (17-1, 17-2, ..., 17-N), and the pressure-generating elements 17 expand or contract in accordance with the drive signal COM. On the contrary, when the discharge data SI supplied to the switching elements 18-1, 18-2, ..., 18-N is "0", the drive signal COM is blocked from being supplied to the pressure-generating elements 17.

The discharge data SI transmitted from the control device 40 is 2-bit data such as (10) and (01) having a high-order bit 1 and a low-order bit 0, and is provided for each nozzle. Accordingly, data including the low-order bits 0 for all of the nozzles is input to the first shift resistor 13A and data including the high-order bits 1 for all of the nozzles is input to the second shift resistor 13B.

The discharge data SI input to the shift resistors 13A and 13B, is latched by the latch circuits 14A and 14B and is input to the decoder 15. The decoder 15 translates the 2-bit discharge data SI into 4-bit discharge data SI on the basis of signals obtained from the control logic 19. When the bit data supplied to the switching elements 18-1, 18-2, ..., 18-N of the switch circuit 18 is "1", the drive signal COM is directly applied to the pressure-generating elements 17-1, 17-2, ..., 17-N, so that the pressure-generating elements 17-1, 17-2, ..., 17-N are deformed in accordance with the waveform of the drive signal COM. On the contrary, when the bit data applied to the switching elements 18-1, 18-2, . . . , 18-N is "0", the drive signal COM is blocked from being supplied to the pressure-generating elements 17-1, 17-2, . . . , 17-N, and the electric charge of the pressure-generating elements 17-1, 17-2, . . . , 17-N is maintained from immediately before.

[Construction of Head 10]

Figure 3:
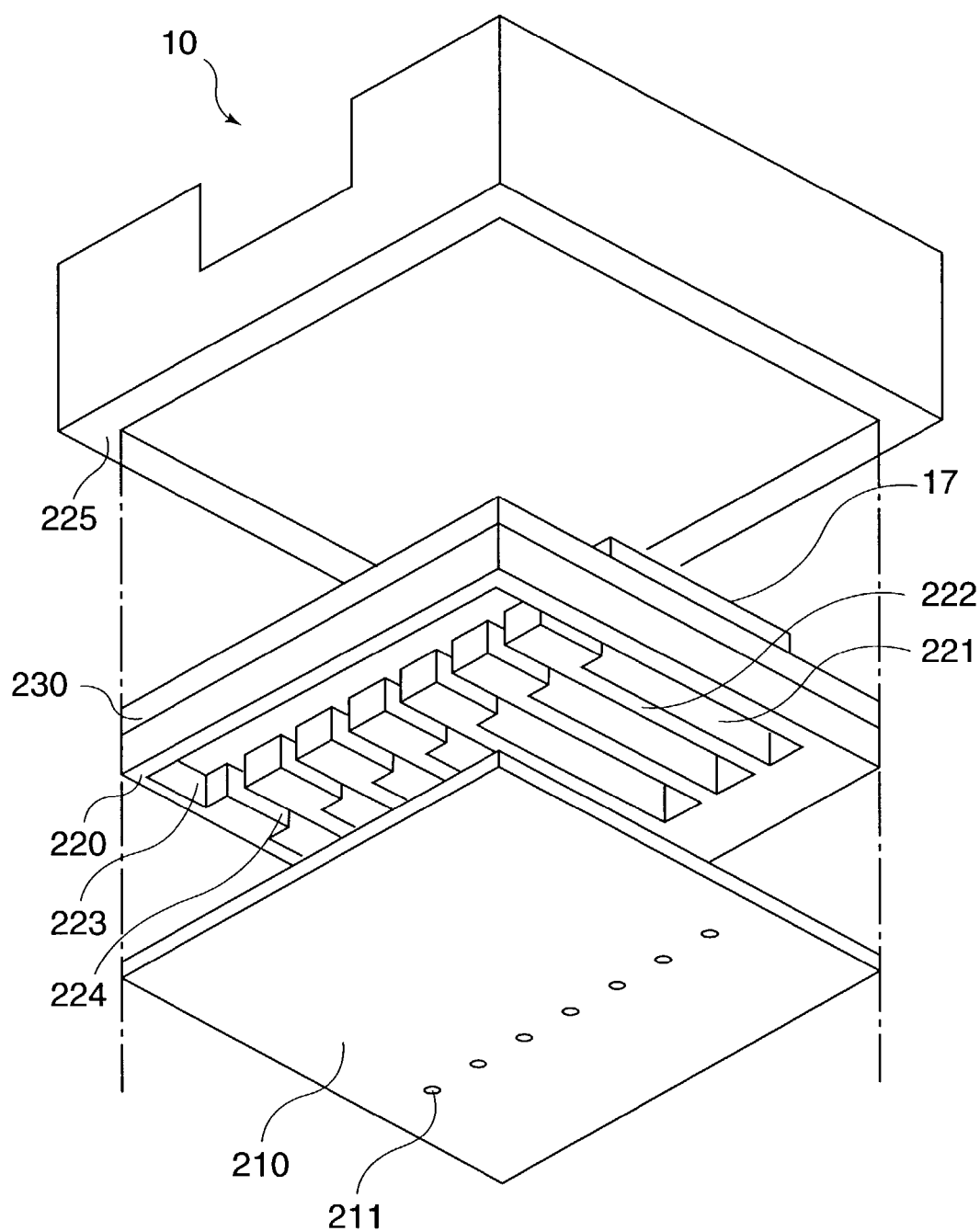
[FIG. 3]
Figure 4:
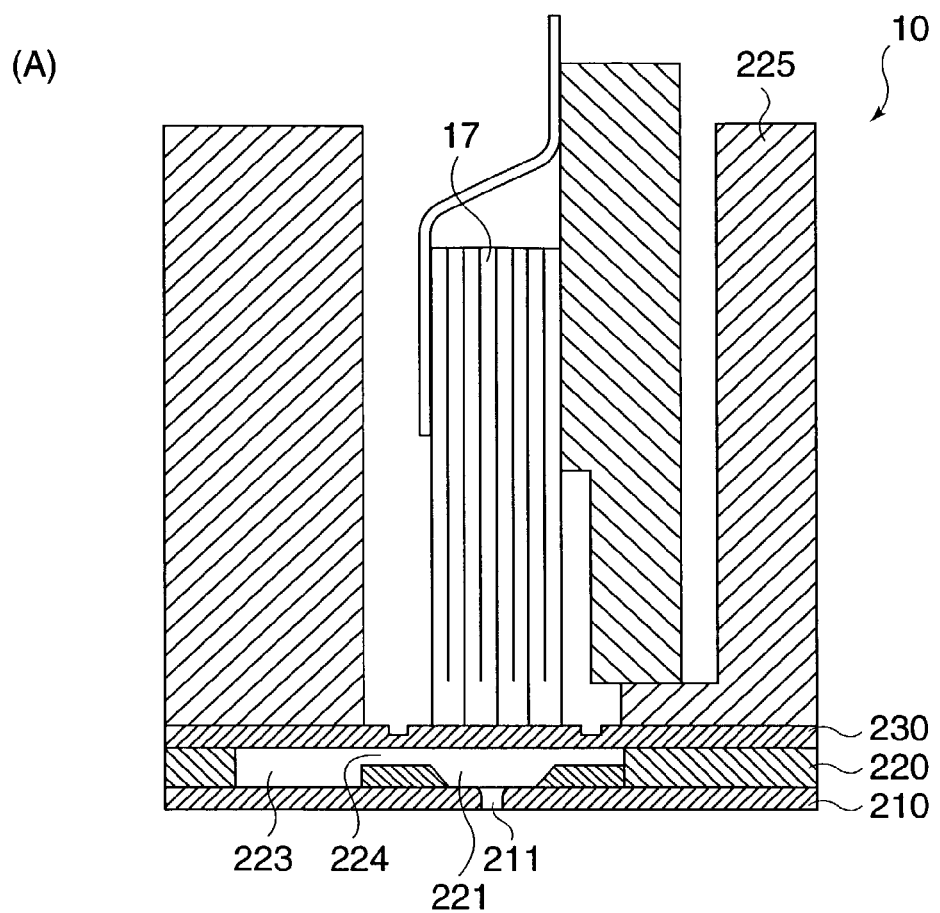
[FIG. 4]
Figure 4:
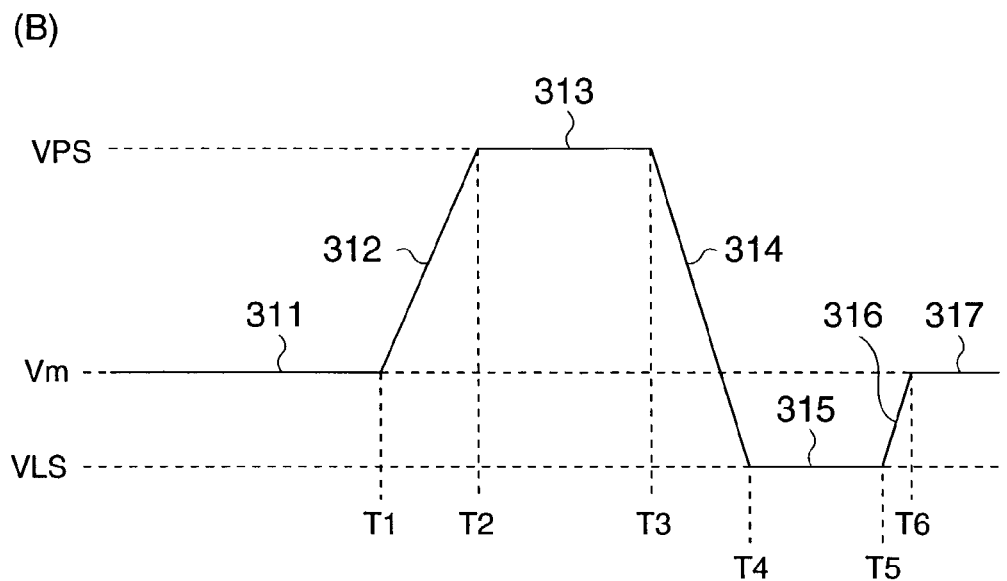

FIG. 3 is an exploded perspective view showing the construction of the head included in the discharge device shown in FIG. 1. In addition, FIG. 4 is an explanatory diagram of the head 10, wherein (A) is a sectional view of an actuator formed in the head shown in FIG. 3 and (b) is a basic waveform of the drive signal applied to the pressure-generating element used in the actuator shown in (a). As shown in FIGS. 3 and 4, the head 10 includes a nozzle plate 210, a pressure-generating-cell plate 220, and a vibrating plate 230. Pressure-generating cells 221, side walls (partition walls) 222, a reservoir 223, and passages 224 are formed in the pressure-generating-cell plate 220. The pressure-generating-cell plate 220 is constructed by etching a substrate of silicone or the like such that the pressure-generating cells 221 are formed. The pressure-generating cells 221 serve to store the viscous liquid immediately before discharging. The side walls 221 are formed so as to separate the pressure-generating cells 221 from each other, and the reservoir 223 serves as a passage for filling the pressure-generating cells 221 with the viscous liquid. The passages 224 are formed such that the passages 224 can guide the viscous liquid from the reservoir 223 to the pressure-generating cells 221.

The nozzle plate 210 is laminated on the pressure-generating-cell plate 220 with an organic or inorganic adhesive at one side thereof such that nozzles 211 are positioned in correspondence with the pressure-generating cells 221 formed in the pressure-generating-cell plate 220. The head 10 is constructed by installing the pressure-generating-cell plate 220, on which the nozzle plate 210 is laminated, into a housing 225. The vibrating plate 230 is formed of a thin plate which deforms elastically, and is laminated on the other side of the pressure-generating-cell plate 220 with an organic or inorganic adhesive. Piezoelectric transducers (PZT) which serve as the pressure-generating elements 17 are disposed on the vibrating plate 230 at positions corresponding to the pressure-generating cells 221.

The pressure-generating elements 17 are not limited to longitudinally vibrating PZTs causing transversal effects, and PZTs which vibrate in the bending mode may also be used. In addition, the pressure-generating elements 17 are not limited to the piezoelectric transducers, and other elements such as magnetostrictive elements may also be used. Furthermore, the pressure may also be changed by heating the viscous liquid and generating bubbles by using heat sources such as heaters. Accordingly, any kind of elements may be used as long as the pressure inside the pressure-generating cells, which will be described below, can be changed in accordance with an externally supplied signal.

[Basic Waveform of Drive Pulse]

Next, a basic waveform of a drive pulse included in the drive signal COM will be described below with reference to FIG. 4(B). With reference to FIG. 4(B), the voltage of the drive signal COM used for activating the pressure-generating elements 17 starts at an intermediate voltage Vm (hold pulse 311), increases to a maximum voltage VPS at a predetermined rate from time T1 to time T2 (charge pulse 312), and is constant at the maximum voltage VPS from time T2 to time T3 (hold pulse 313). Then, the voltage decreases to a minimum voltage VLS at a predetermined rate from time T3 to time T4 (discharge pulse 314), is constant at the minimum voltage VLS from time T4 to time T5 (hold pulse 315), and increases to the intermediate voltage Vm at a predetermined rate from time T5 to time T6 (charge pulse 316).

With reference to FIGS. 4(A) and (B), when the charge pulse 312 is applied to the pressure-generating element 17, the pressure-generating-element 17 deforms so as to increase the volume inside the pressure-generating cell 221, so that the pressure inside the pressure-generating cell 221 is reduced. As a result, the meniscus at the nozzle 211 retracts. Then, when the discharge pulse 314 is applied, the pressure-generating element 17 deforms so as to reduce the volume inside the pressure-generating cell 221, so that the pressure inside the pressure-generating cell 221 is increased. As a result, a drop of liquid is discharged from the nozzle 211. Then, after the hold pulse 315 is applied, the charge pulse 316 is applied so as to suppress the vibration of the meniscus. As the maximum voltage VPS and the inclination of the discharge pulse 314 increase, the weight corresponding to a single dot formed by the viscous liquid discharged from the nozzle 211 increases.

[Construction of Drive-Signal Generating Unit 48]

Figure 5:
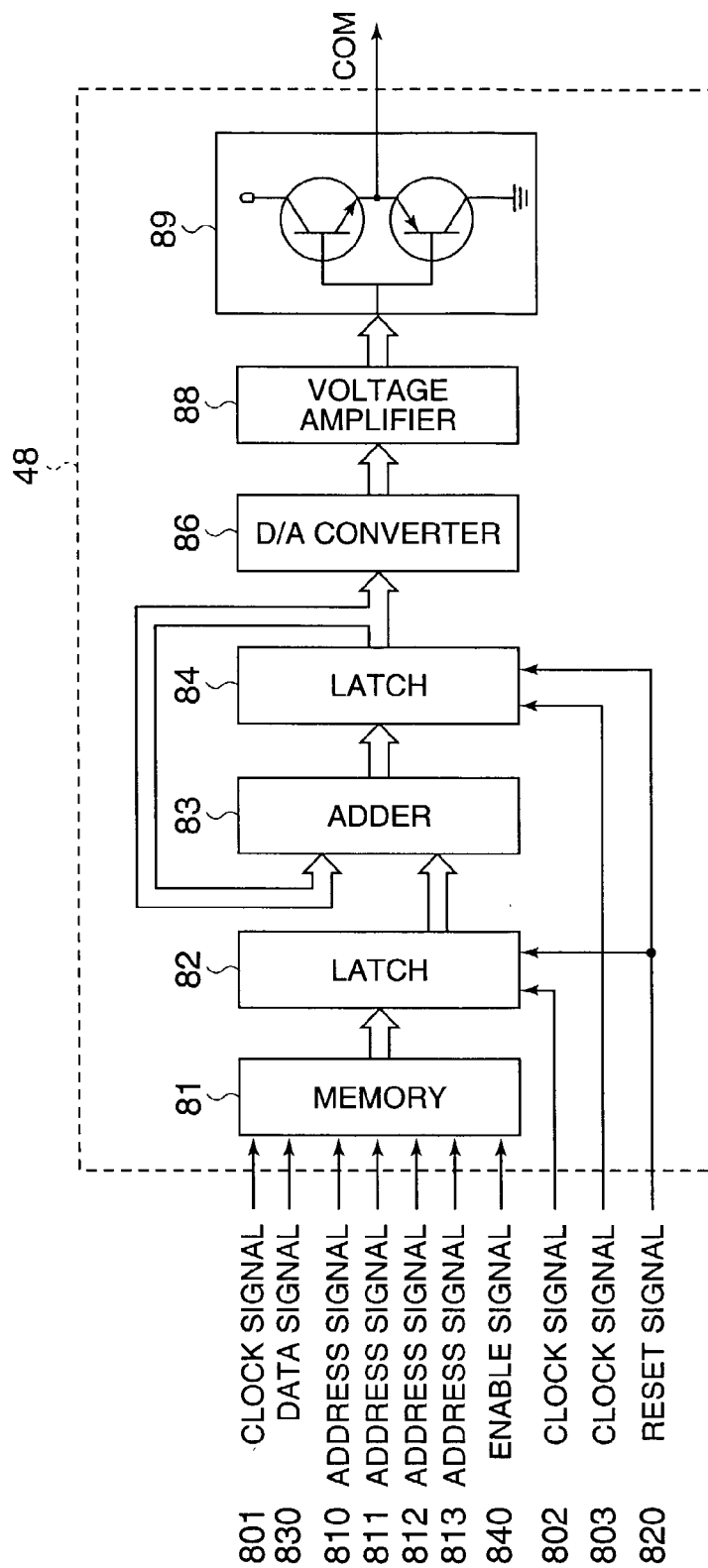
[FIG. 5]
Figure 6:
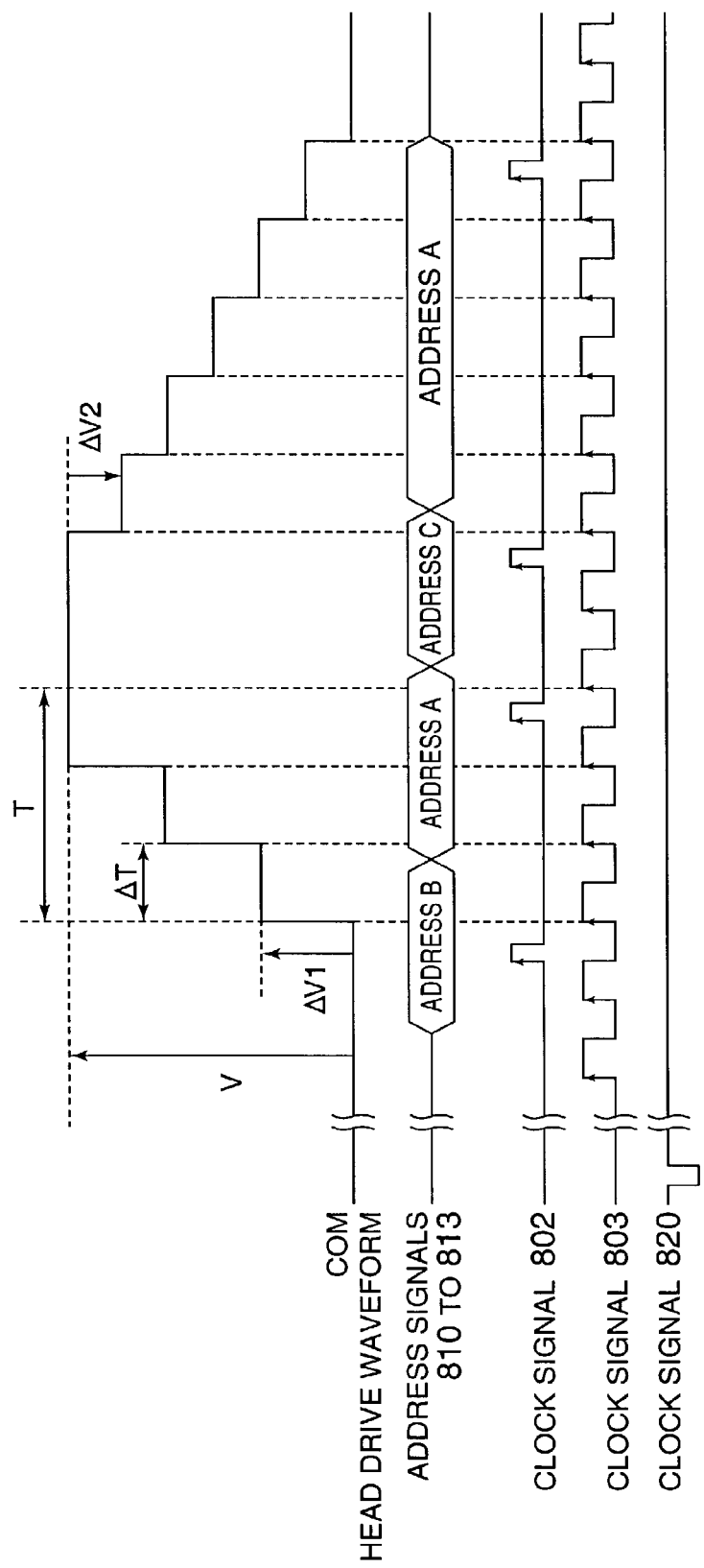
[FIG. 6]
Figure 7:
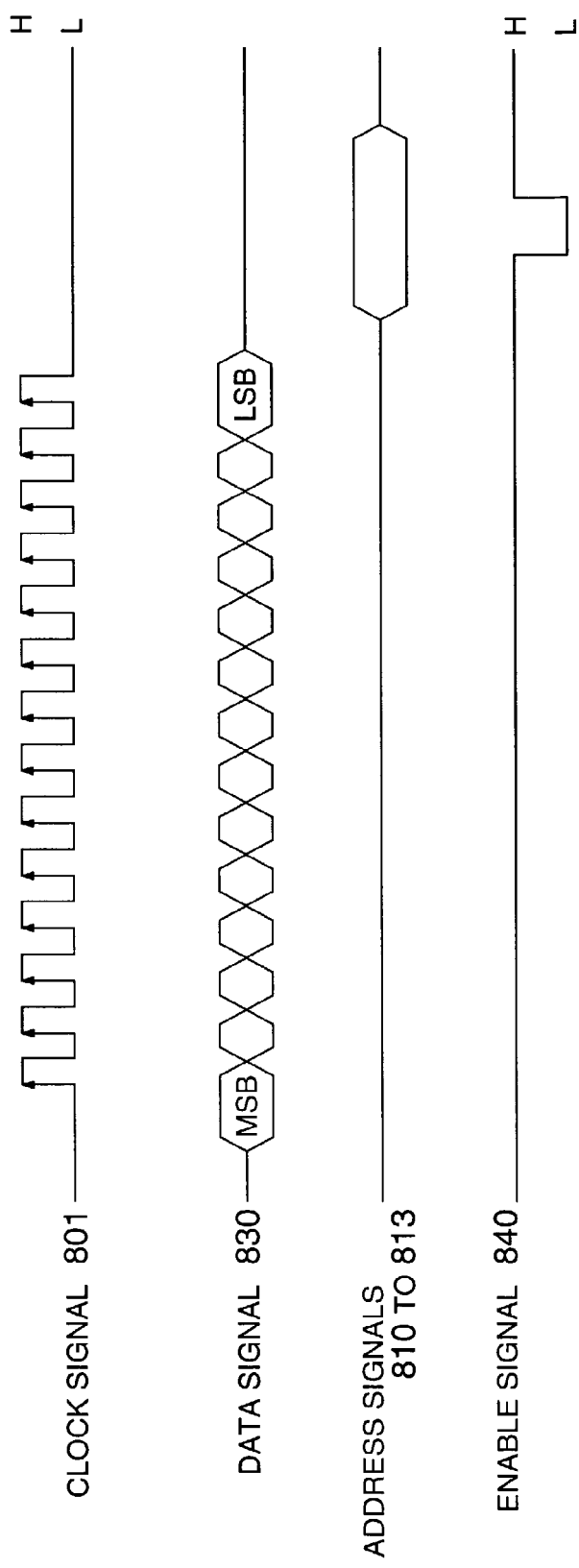
[FIG. 7]

Next, the drive-signal generating unit 48 will be described with reference to FIGS. 5 to 7. FIG. 5 is a block diagram showing the construction of the drive-signal generating unit 48. FIG. 6 is an explanatory diagram showing a process in which a drive pulse included in the drive signal COM is generated in the drive-signal generating unit 48, and FIG. 7 is a timing chart showing the timing of signals used in the process of setting a potential difference (ΔV) in a memory by using a data signal in the drive-signal generating unit 48.

As shown in FIG. 5, the drive-signal generating unit 48 includes a memory 81 which receives and stores signals from the main-body control unit 46, a first latch 82 which reads out and holds the contents of the memory 81, an adder 83 which adds the output from the first latch 82 and the output from a second latch 84 which will be described below, a D/A converter 86 which converts the output of the second latch 84 into analog data, a voltage amplifier 88 which amplifies the voltage of the obtained analog signal to the voltage of the drive signal, and a current amplifier 89 for the drive signal which is output from the voltage amplifier 88.

The memory 81 serves as a waveform-data storage unit which stores predetermined parameters for determining the waveform of the drive signal COM. The waveform of the drive signal COM is determined by the parameters obtained from the main-body control unit 46 in advance. More specifically, the drive-signal generating unit 48 receives clock signals 801, 802, and 803, a data signal 830, address signals 810, 811, 812, and 813, a reset signal 820, and an enable signal 840.

As shown in FIG. 6, in the drive-signal generating unit 48 which is constructed as described above, several data signals indicating the amounts of voltage change in the main-body control unit 46 and addresses corresponding to the data signals are input to the memory 81 of the drive-signal generating unit 48 in synchronization with the clock signal 801 before the drive signal COM is generated. As shown in FIG. 7, the data signal 830 is communicated by serial transmission using the clock signal 801 as the synchronization signal.

More specifically, when a predetermined amount of voltage change is transmitted from the main-body control unit 46, the data signal including a plurality of bits is output in synchronization with the clock signal 801, and address signals 810 to 813 indicating the address for storing this data are output in synchronization with the enable signal 840. The memory 81 reads out the address signals when the enable signal 840 is output, and records the received data at that address. Since the address signals 810 to 813 indicate a 4-bit signal, up to sixteen different amounts of voltage change can be stored in the memory 81. The most significant bit of the data is used for indicating the sign. The number of bits of the address signals 810 to 813 is not limited to four, and may be set to five or more. When the number of bits of the address signals 810 to 813 is increased, more than sixteen different amounts of voltage change can be stored in the memory 81, so that the range for setting the amount of voltage change can be increased.

Accordingly, the amount of voltage change is set for each of the addresses A, B, . . . , and when, for example, the address signals 810 to 813 indicates the address B, the first latch circuit 82 holds the amount of voltage change $\Delta V1$ corresponding to the address B upon receiving the first clock signal 802. Then, when the clock signal 803 is input in this state, the second latch circuit 84 holds the sum of the output of the first latch circuit 82 and the output of the second latch circuit 84. Accordingly, as shown in FIG. 6, once the amount of voltage change corresponding to the address signals is selected, the output of the second latch circuit 84 increases, or decreases, in steps of the selected amount of voltage change every time the clock signal 803 is input. The slew rate of the drive waveform is determined on the basis of the amount of voltage change $\Delta V1$ stored in the memory 81 at the address B and the time period $\Delta T$ of the clock signal 803. Whether the voltage is increased or reduced is determined by the sign of the data stored in each address.

In the example shown in FIG. 6, the amount of voltage change stored in the address A is 0, which means that the voltage is maintained constant. Accordingly, when the address A becomes effective upon receiving the clock signal 802, the waveform of the drive signal remains flat and does not rise or fall. In addition, an amount of voltage change $\Delta V2$ per time period $\Delta T$ which determines the slew rate of the drive signal is stored at the address C. Accordingly, when the address C becomes effective upon receiving the clock signal 802, the voltage decreases in steps of $\Delta V2$. Accordingly, merely by outputting the address signals and the clock signals from the main-body control unit 46, the waveform of the drive signal COM can be freely controlled. In the present embodiment, the drive signal COM shown in FIG. 8, which includes four drive pulses in a single discharge cycle, is generated.

Figure 8:
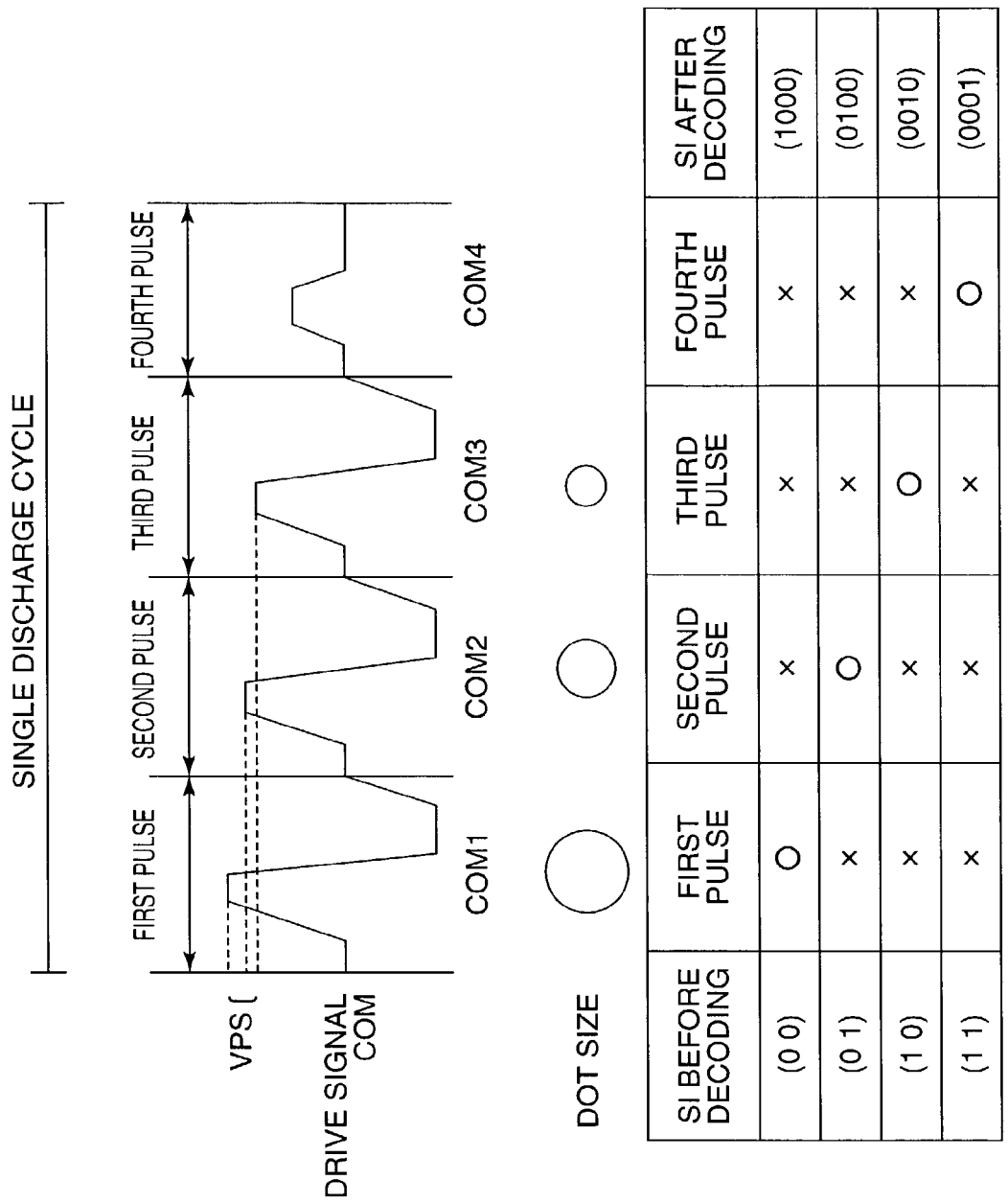
[FIG. 8]

FIG. 8 is an explanatory diagram showing a waveform of a common drive signal COM used in the discharge device 1 according to the first embodiment of the present invention, the relationship between the drive pulse in the drive signal COM applied to the pressure-generating element 17 and the dot size of the viscous liquid discharged from the corresponding nozzle 211, and a method of selecting one of the drive pulses from the drive signal COM on the basis of the discharge data SI, and applying it to the pressure-generating element 17. In addition, in FIGS. 9, (A), (B), (C), (D), and (E) are a waveform of the common drive-signal COM used in the discharge device 1 according to the present embodiment, a waveform of a signal applied to the pressure-generating element 17 when a first drive pulse is selected from the common drive signal COM, a waveform of a signal applied to the pressure-generating element 17 when a second drive pulse is selected from the common drive signal COM, a waveform of a signal applied to the pressure-generating element 17 when a third drive pulse is selected from the common drive signal COM, and a waveform of a signal applied to the pressure-generating element 17 when a fourth drive pulse is selected from the common drive signal COM, respectively.

As shown in FIG. 8, the drive signal COM includes four drive pulses COM1, COM2, COM3, and COM4 in a single discharge cycle. In the first, second, and third drive pulses COM1, COM2, and COM3, the maximum voltage VPS explained above with reference to FIG. 4(B) is reduced in the order of the first, second, and third drive pulses COM1, COM2, and COM3. Accordingly, when the first, second, and third drive pulses COM1, COM2, and COM3 are applied to the same pressure-generating element 17, the weights of the viscous liquid discharged from the corresponding nozzle will be "large", "medium", and "small", respectively.

Accordingly, the first, second, and third drive pulses COM1, COM2, and COM3 can be expressed as a large-dot pulse, a medium-dot pulse, and a small-dot pulse, respectively. The "large", "medium", and "small" weights differ by, for example, several percent. The fourth drive pulse COM4 is used for slightly vibrating the viscous liquid near the nozzle 211 so as to avoid the increase of viscosity and hardening of the viscous liquid. Since the viscous liquid is not discharged by the fourth drive pulse COM4, the fourth drive pulse COM4 can be expressed as a "slight-vibration pulse".

Figure 9:
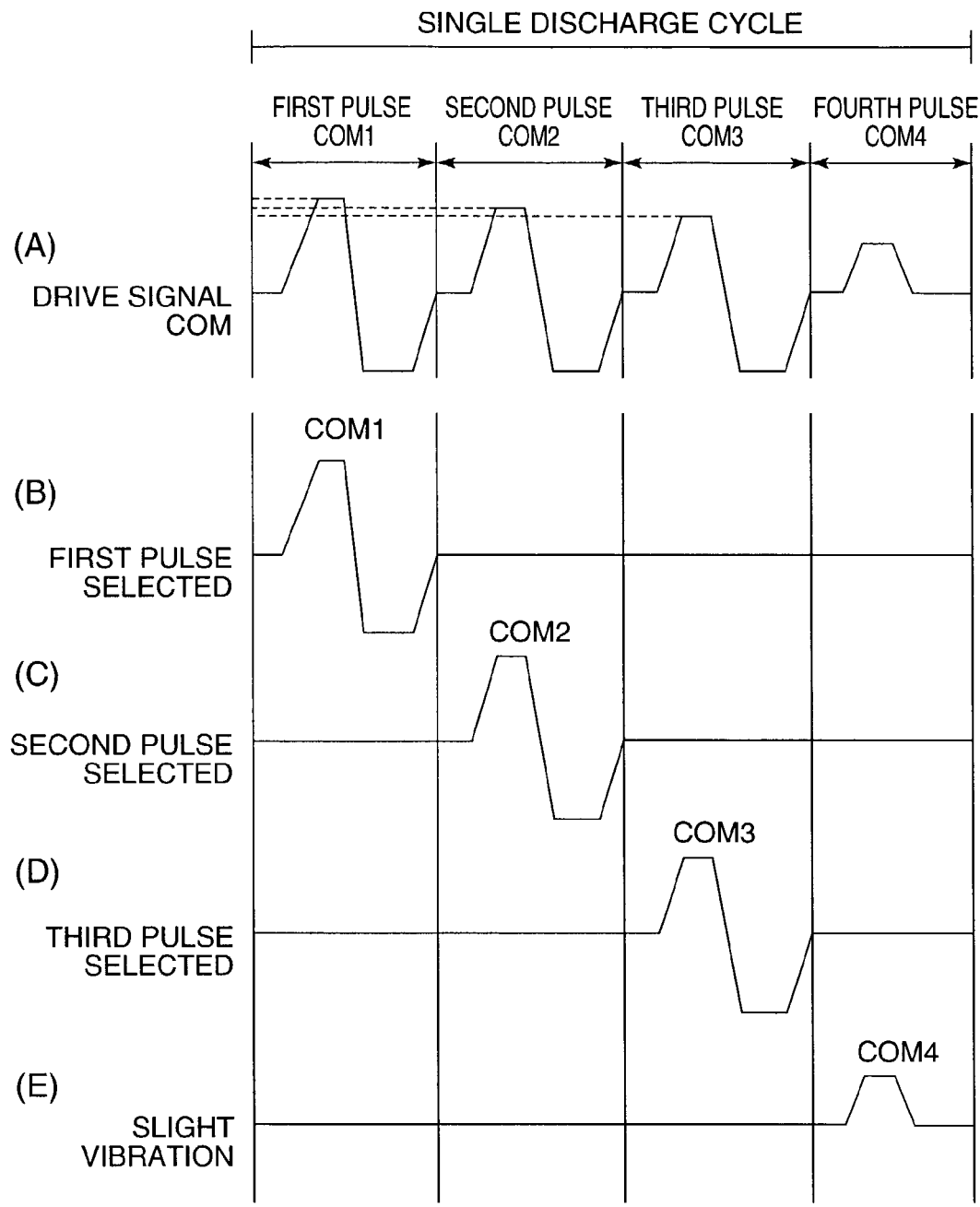
[FIG. 9] In FIGS. 9, (A), (B), (C), (D), and (E) are the waveform of the common drive signal used in the discharge device shown in FIG. 1, a waveform of a drive signal applied to the pressure-generating element when a first drive pulse is selected from the common drive signal, a waveform of a drive signal applied to the pressure-generating element when a second drive pulse is selected from the common drive signal, a waveform of a drive signal applied to the pressure-generating element when a third drive pulse is selected from the common drive signal, and a waveform of a drive signal applied to the pressure-generating element when a fourth drive pulse is selected from the common drive signal, respectively.

Next, a method for reducing the variation in the discharge weight between the nozzles by selecting one of the first drive pulse COM1 (large-dot pulse), the second drive pulse COM2 (medium-dot pulse), and the third drive pulse COM3 (small-dot pulse) from the drive signal COM will be described below with reference to FIGS. 8 and 9. As described above with reference to FIG. 2, while the discharge data SI supplied to the switch circuit 18 by the decoder 15 indicates "1", the drive signal COM is applied to the pressure-generating elements 17, and the pressure-generating elements 17 expand or contract in accordance with the waveform of the drive signal COM. On the contrary, while the discharge data SI indicates "0", the drive signal COM is blocked from being supplied to the pressure-generating elements 17, and the state of the pressure-generating elements 17 is maintained from immediately before. Accordingly, when the discharge data SI is changed in synchronization with the generation of the first to fourth drive pulses COM1 to COM4, one of the first to fourth drive pulses COM1 to COM4 can be selectively applied to the pressure-generating elements 17.

In the present embodiment, the variation in the discharge weight between nozzles 211 at which the discharge weight is smaller than average, nozzles 211 at which the discharge weight is average, and nozzles 211 at which the discharge weight is larger than average when the same drive pulse is applied, is corrected by the following method. That is, the first drive pulse COM1 (large-dot pulse) is applied to the pressure-generating elements 17 corresponding to the nozzles 211 at which the discharge weight is smaller than average, the second drive pulse COM2 (medium-dot pulse) is applied to the pressure-generating elements 17 corresponding to the nozzles 211 at which the discharge weight is average, and the third drive pulse COM3 (small-dot pulse) is applied to the pressure-generating elements 17 corresponding to the nozzles 211 at which the discharge weight is larger than average.

When the above-described driving method is applied, drive pulses having the same waveform are applied to each of the pressure-generating elements 17 formed in the head 10 in advance, and the weight corresponding to a single dot formed by the viscous liquid discharged from each nozzle 211 is measured in advance, as will be described in detail below. Then, the nozzles 211 are classified into a group of nozzles 211 at which the discharge weight is smaller than average, a group of nozzles 211 at which the discharge weight is average, and a group of nozzles 211 at which the discharge weight is larger than average. The result of the classification is input to the computer 1B as the nozzle data, and the nozzle data is stored in the storage unit 72 of the computer 1B.

When a discharge pattern of the viscous liquid on the target W is determined by the computer 1B, the discharge pattern is input to the main body 1A as the discharge conditions along with the nozzle data stored in the storage unit 72. Then, when the discharge pattern is expanded to the dot-pattern data by the main-body control unit 46 in the main body 1A, the waveform selection data defining which of the drive pulses COM1 to COM4 included in the drive signal COM is to be applied on the basis of the nozzle data is added to the discharge data SI. The waveform-selection data is expressed as 2-bit discharge data (00), (01), (10), or (11), and this 2-bit discharge data is translated into 4-bit data by the decoder 15. This 4-bit data is synchronized with the generation of the drive pulses COM1 to COM4 included in the drive signal COM.

For example, 2-bit data (00) is decoded into 4-bit data (1000) by the decoder 15, so that the pressure-generating elements 17 which drive the nozzles 211 corresponding to this data receive only the first drive pulse COM1, as shown in FIG. 9(B). In addition, 2-bit data (01) is translated (decoded) into 4-bit data (0100) by the decoder 15, so that the pressure-generating elements 17 which drive the nozzles 211 corresponding to this data receive only the second drive pulse COM2, as shown in FIG. 9(C).

In addition, 2-bit data (10) is decoded into 4-bit data (0010) by the decoder 15, so that the pressure-generating elements 17 which drive the nozzles 211 corresponding to this data receive only the third drive pulse COM3, as shown in FIG. 9(D). In addition, 2-bit data (11) is translated (decoded) into 4-bit data (0001) by the decoder 15, so that the pressure-generating elements 17 which drive the nozzles 211 corresponding to this data receive only the fourth drive pulse COM4, as shown in FIG. 9(E).

Accordingly, when the discharge data SI is constructed such that 1-bit data is assigned to each of the drive pulses COM1 to COM4, a desired drive pulse can be selected from the drive pulses COM1 to COM4. Accordingly, the first drive pulse COM1 (large-dot pulse) is applied to the pressure-generating elements 17 corresponding to the nozzles 211 at which the discharge weight is smaller than average, the second drive pulse COM2 (medium-dot pulse) is applied to the pressure-generating elements 17 corresponding to the nozzles 211 at which the discharge weight is average, and the third drive pulse COM3 (small-dot pulse) is applied to the pressure-generating elements 17 corresponding to the nozzles 211 at which the discharge weight is larger than average. Therefore, the weight corresponding to a single dot formed by the viscous liquid discharged from each nozzle becomes uniform. In addition, when, for example, a microlens array is manufactured, microlenses having uniform lens characteristics can be obtained, as will be described below.

[Method for Determining Nozzle Data]

Next, a method for determining the nozzle data of the head in the head-testing device will be described below with reference to FIGS. 10 and 11. The head-testing device includes a CPU, a RAM, a ROM, etc., and the following process is performed in accordance with a program stored in the ROM.

Figure 10:
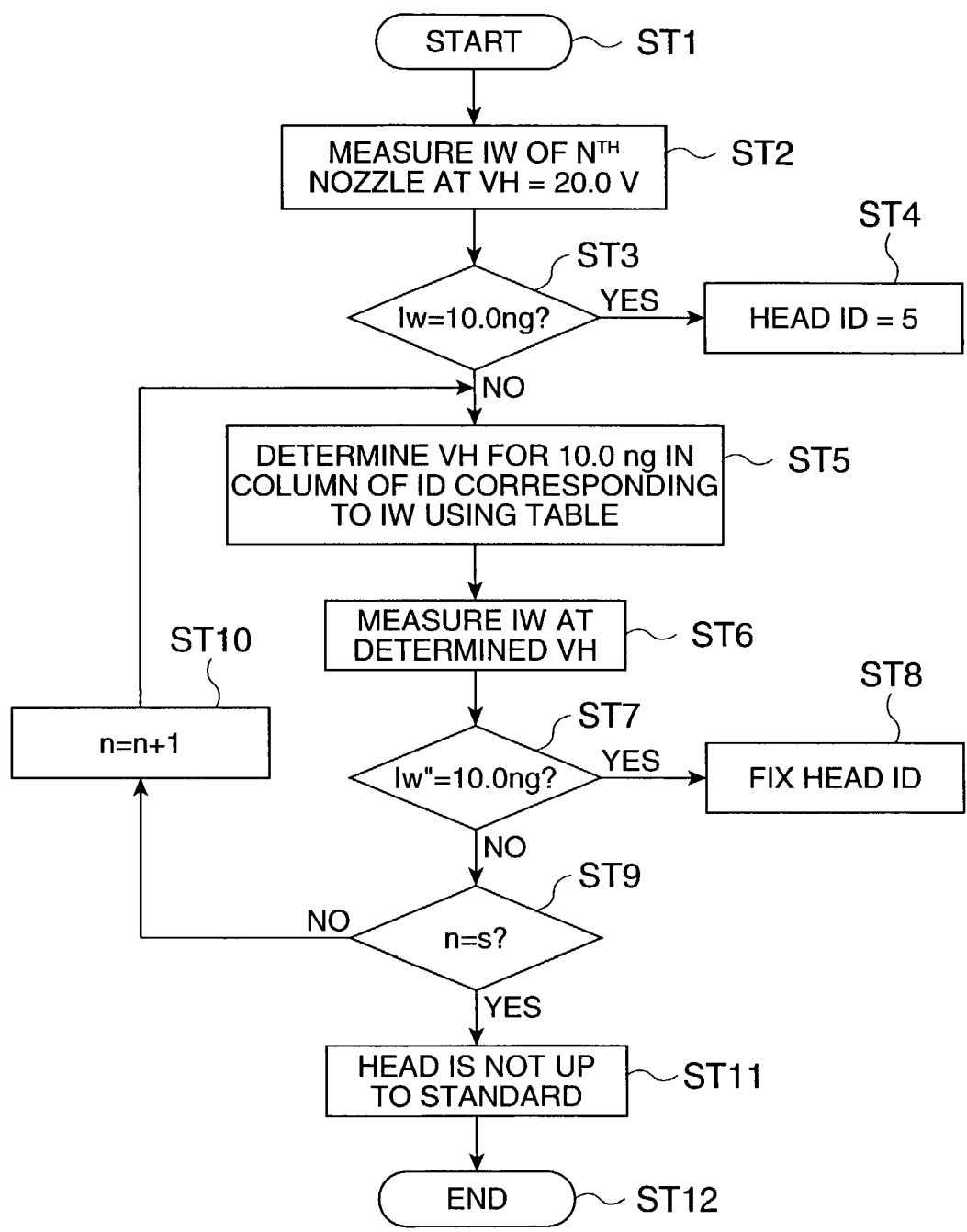
[FIG. 10]

FIG. 10 is a flowchart showing a process of determining the nozzle data, and FIG. 11 is an explanatory diagram of a table used in the process of determining the nozzle data shown in FIG. 10, showing the relationship between the drive pulses having waveforms with different maximum voltages and the weights of the viscous liquid discharged from the head when the drive pulses are applied to the pressure-generating element. In the present embodiment, as shown in FIG. 11, a table showing the relationship between the drive pulses having waveforms with maximum voltages VH ranging from 19.2 V to 20.8 V in steps of 0.2 V and the weights of the viscous liquid discharged from the nozzle 211 when the drive pulses are applied to the corresponding pressure-generating element is prepared before the process shown in FIG. 10 is performed.

Then, with reference to FIG. 10, when the operation of determining the nozzle data is started, parameters are initialized first (ST1). For example, a parameter n indicating the number of repetitions, which will be described below, is set to "1". Next, a drive pulse having a waveform whose maximum voltage VH is, for example, 20.0 V, is applied to the pressure-generating element, and the weight Iw of the viscous liquid discharged from the head is measured (ST2). Next, whether or not the discharge weight Iw is 10.0 ng (desired weight) is determined at ST3, and when the discharge weight Iw is 10.0 ng, a nozzle ID is determined as "5" (ST4).

When it is determined that the discharge weight Iw is different from the desired weight 10.0 ng at ST3, the table shown in FIG. 11 is referred to for the nozzle ID corresponding to the discharge weight Iw in the row where the maximum voltage VH is 20 V, and the maximum voltage VH at which the desired weight 10.0 ng is obtained in the column of that nozzle ID is determined (ST5: first step). For example, when the drive pulse having a waveform whose maximum voltage VH is 20 V is applied to the pressure-generating element and the weight Iw of the viscous liquid discharged from the head at this time is determined as 9.6 ng at ST2, the nozzle ID at which the discharge weight Iw is 9.6 in the row where the maximum voltage VH is 20 V is determined as "3" (see section B). Accordingly, the maximum voltage VH at which the desired weight 10.0 ng is obtained in the column corresponding to this nozzle ID is determined as 20.4 V (see section C).

Next, the drive pulse having a waveform whose maximum voltage VH is 20.4 V is applied to the pressure-generating element, and the weight Iw of the viscous liquid discharged from the head is measured (ST6: second step). Then, whether or not the discharge weight Iw is 10.0 ng, that is, the desired weight, is determined at ST7, and when the discharge weight Iw is 10.0 ng, the nozzle ID is determined as "3" (ST8: third step). When it is determined that the discharge weight Iw is different from the desired weight 10.0 ng at ST7, whether or not the number of repetitions n is S is determined at ST9. When the number of repetitions n is not S, the number of repetitions n is increased by 1 (ST10), and the process returns to ST5.

If, for example, the weight Iw of the viscous liquid discharged from the head is 9.8 ng even when the drive pulse having a waveform whose maximum voltage VH is 20.4 V is applied to the pressure-generating element, the nozzle ID at which the discharge weight Iw is 9.8 in the row where the maximum voltage VH is 20.4 V is determined as "2" (see section D), and the maximum voltage VH at which the discharge weight Iw is 10.0 ng in the column corresponding to this nozzle ID is determined as 20.6 V (see section D).

Next, the drive pulse having a waveform whose maximum voltage VH is 20.6 V is applied to the pressure-generating element, and the weight Iw of the viscous liquid discharged from the head is measured (ST6). Then, whether or not the discharge weight Iw is 10.0 ng is determined at ST7, and when the discharge weight Iw is 10.0 ng, the nozzle ID is determined as "2" (ST8). When it is determined that the discharge weight Iw is different from 10.0 ng at ST7, whether or not the number of repetitions n is S is determined at ST9. When the number of repetitions n is not S, the number of repetitions n is increased by 1, the process returns to ST5, and the above-described steps are repeated.

When the number of repetitions n is S at ST10, it is determined that the head is not up to standard (ST11) and the operation of determining the nozzle data is finished (ST12). Thus, the constant S defines the upper limit of the number of repetitions n. The nozzle ID is determined for each of the nozzles 211 formed in the head 10 by the above-described process. When drive pulses having waveforms whose maximum voltages VH correspond to the nozzle IDs determined for each nozzle 211 (see FIGS. 8 and 9) are applied to the pressure-generating elements, a drop of viscous liquid whose weight is 10.0 ng can be discharged from all of the nozzles 211.

Although the nozzle IDs may be used directly as the nozzle data, since the drive signal COM including three kinds of drive pulses COM1, COM2, and COM3 is used in the present embodiment as described above with reference to FIGS. 8 and 9, the nozzle IDs "1" to "9" are classified into groups 1, 2, and 3, as shown in FIG. 11. Accordingly, among groups 1, 2, and 3, the group to which the nozzle belongs is determined as the nozzle data. More specifically, the nozzles 211 whose nozzle IDs are "1" to "3" are evaluated such that the discharge weights thereof are smaller than average and are classified into group 1. The heads classified into group 1 are driven by the first drive pulse COM1 (large-dot pulse) whose maximum voltage VH is 20.6 V.

In addition, as shown in FIG. 11, the nozzles 211 whose nozzle IDs are "4" to "6" are evaluated such that the discharge weights thereof are average and are classified into group 2. The heads classified into group 2 are driven by the second drive pulse COM2 (medium-dot pulse) whose maximum voltage VH is 20.0 V. Furthermore, as shown in FIG. 11, the nozzles 211 whose nozzle IDs are "7" to "9" are evaluated such that the discharge weights thereof are larger than average and are classified into group 3. The heads classified into group 3 are driven by the third drive pulse COM3 (small-dot pulse) whose maximum voltage VH is 19.4 V.

[Other Embodiments]

Although the drive signal COM having three drive pulses COM1 to COM3 for the discharge operation in a single cycle is used in the above-described embodiment, the number of drive pulses is not limited to three. For example a drive signal COM having nine pulses in a single cycle may also be used. In such a case, it is not necessary to classify the nozzles 211 into groups, and the nozzle IDs ("1" to "9") determined for each nozzle 211 may be used directly as the nozzle data. Accordingly, drive pulses which are more accommodative to the characteristics of each nozzle 211 can be applied and the variation in the discharge weight between the nozzles can be further reduced.

Figure 12:
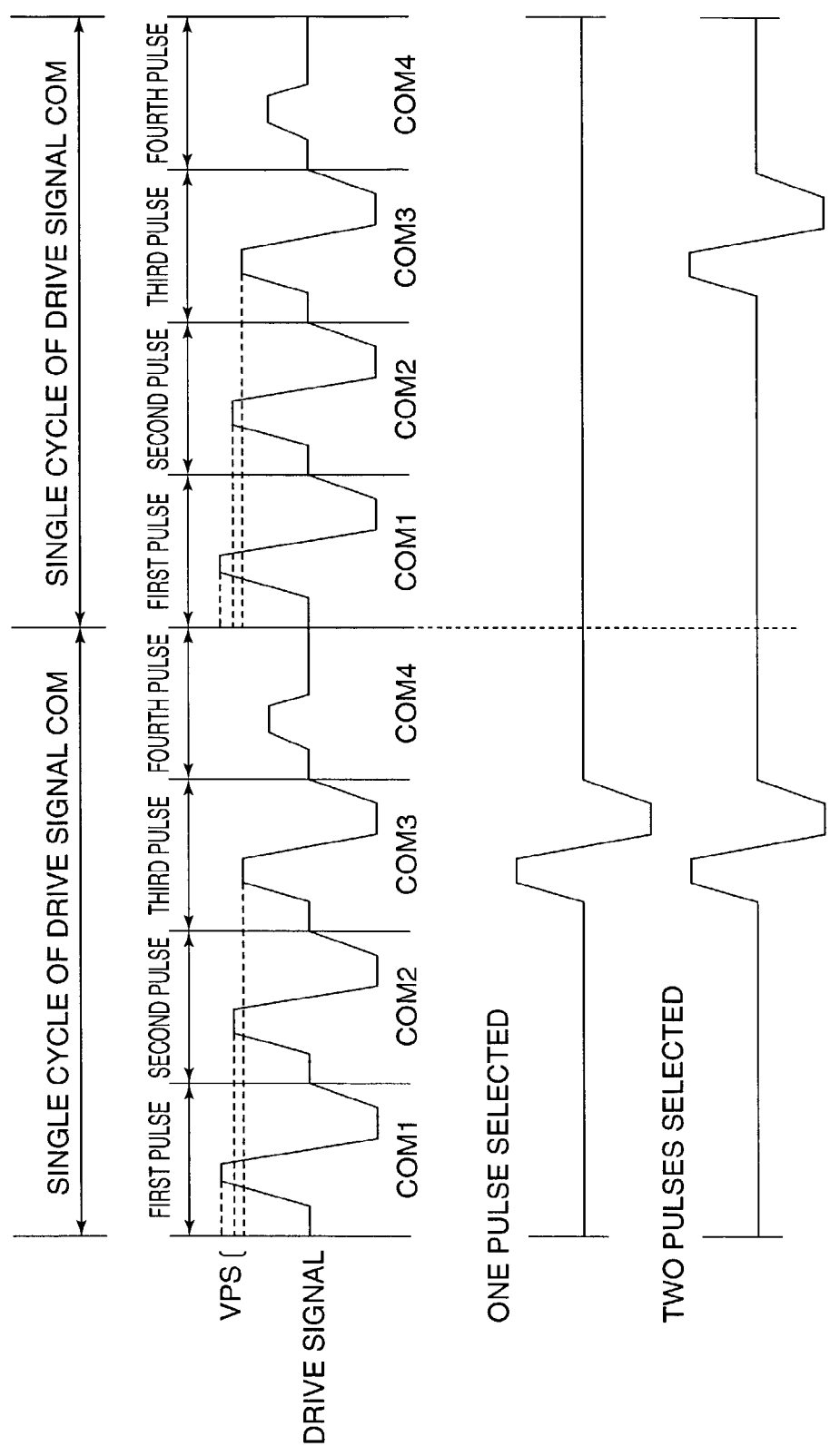
[FIG. 12]

In addition, although a single diving pulse is selected from the three drive pulses COM1, COM2, and COM3 included in a single cycle of the drive signal COM in the above-described embodiment, the dot may also be formed by using a plurality of drive pulses selected in accordance with the nozzle data. In addition, although a single diving pulse is selected from the three drive pulses COM1, COM2, and COM3 included in a single cycle of the drive signal COM in the above-described embodiment, the dot may also be formed by using one or more pulses selected from a plurality of cycles, for example, two cycles, as shown in FIG. 12. FIG. 12 is an explanatory diagram showing a waveform of a drive signal used in the discharge device according to another embodiment of the present invention.

Figure 13:
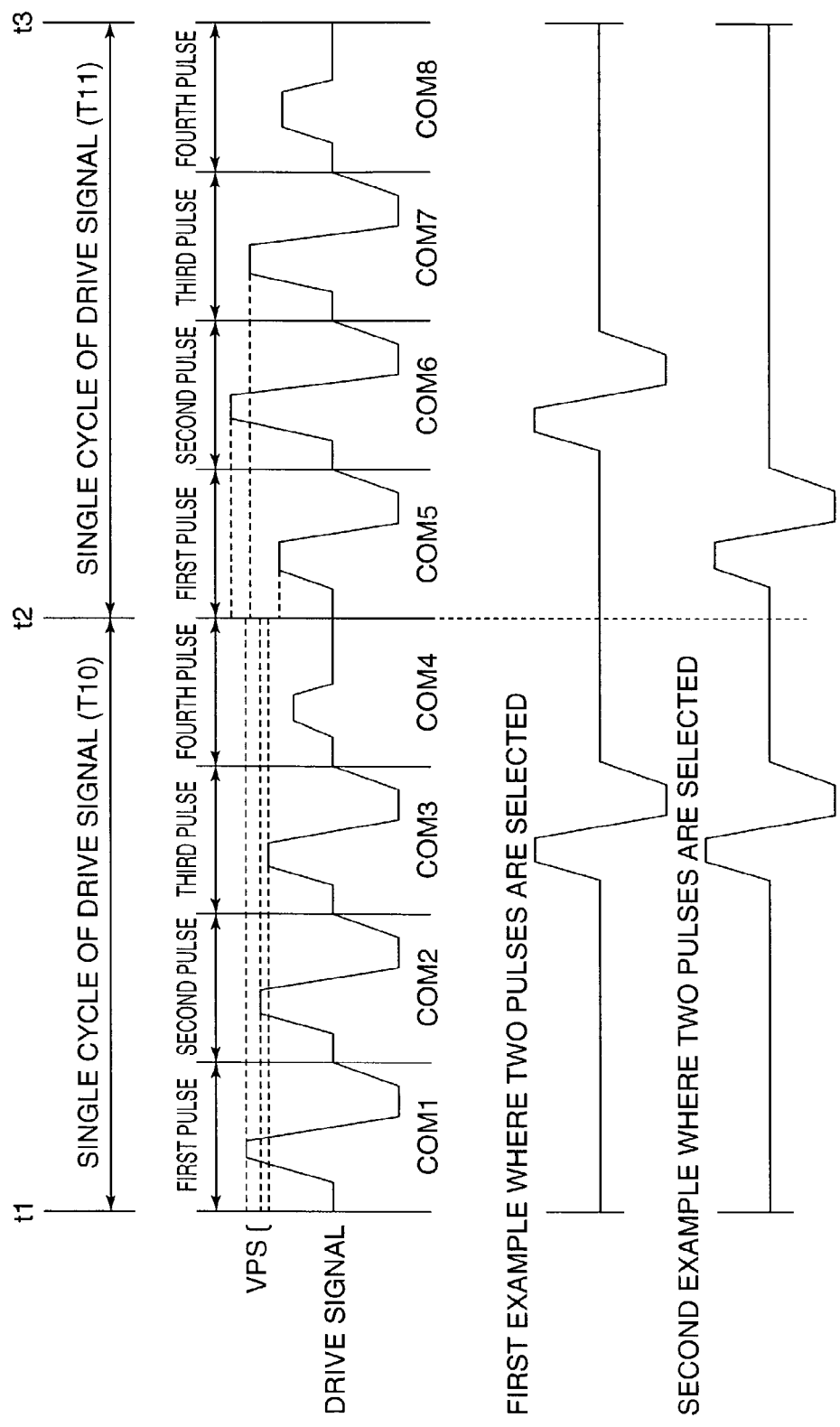
[FIG. 13]

In the example shown in FIG. 12, the adjacent two cycles of the drive signal COM include the same drive pulses COM1 to COM4. However, the waveforms of the pulses included in a single cycle of the drive signal COM may be changed in each cycle. FIG. 13 is an explanatory diagram showing an example of a waveform of a drive signal COM where pulses are changed at each cycle of the drive signal COM. In FIG. 13, two adjacent cycles include pulses having different waveforms. In addition to changing the waveforms of the pulses between two cycles as shown in FIG. 13, the waveforms of the pulses may of course be changed over three or more cycles.

In the example shown in FIG. 13, the waveform of the drive signal COM in the period T10 from time t1 to time t2 is the same as that shown in FIG. 12, that is, the waveform including the drive pulses COM1 to COM4. However, the waveform of the drive signal COM in the period T11 from time t2 to time t3 is different from that in the period T10, and includes drive pulses COM5 to COM8. As described above, the maximum voltage VPS is reduced in the order of the first, second and third drive pulses COM1, COM2, and COM3, and the fourth drive pulse COM4 is used for slightly vibrating the viscous liquid near the nozzle 211 so as to avoid the increase of viscosity and hardening of the viscous liquid. However, the drive pulses COM5 to COM8 shown in FIG. 13 do not have ordinality similar to that of the drive pulses COM1 to COM3; whose maximum voltages VPS are reduced in that order, and have different ordinality or are determined arbitrarily.

The purpose of changing the waveform of the drive signal COM in each cycle is to correct the variation in the discharge weight corresponding to a single dot between the nozzles 211 with high precision and make the amount of discharge uniform, and to increase the resolution of the discharge weight. More specifically, when, for example, the drive signal COM shown in FIG. 12 is used and the same pulse is selected in each cycle, the discharge weight can only be set in correspondence with an integer multiple of the large-dot pulse, the medium-dot pulse, or the small-dot pulse. In addition, when, for example, the drive signal COM shown in FIG. 12 is used and different pulses are selected in each cycle, the discharge weight can only be set in correspondence with a combination of the large-dot pulse, the medium-dot pulse, and the small-dot pulse. This is not enough to correct the variation in the discharge weight between the nozzles and to increase the resolution.

However, in the present embodiment, as shown in FIG. 13, the drive signal COM having different waveforms in each cycle is generated, so that a discharge weight other than the weight corresponding to the large-dot pulse, the medium-dot pulse, and the small-dot pulse can be obtained.

Which of the pulses included in a plurality of cycles is (are) to be used is determined on the basis of the variation in the discharge weight between the nozzles which is determined in advance. Accordingly, the variation in the discharge amount between the nozzles can be reliably corrected at high precision.

In addition, when arbitrary pulses are selected from a plurality of cycles, the number of combinations of the discharge weights increases, so that the resolution also increases. Furthermore, also in the example shown in FIG. 13, dots may be formed by using a plurality of pulses selected from the drive pulses COM1, COM2, and COM3 included in the period T10 and a plurality of pulses selected from the drive pulses COM5, COM6, and COM7 included in the period T11. By changing the combination of pulses in accordance with the variation in the nozzle weight, the variation in the discharge weight between the nozzles can be reliably corrected with high precision. As a result, microlenses, etc., can be formed with high precision.

In addition, in the case in which the viscous liquid is discharged by using one (or more) pulse selected at each of the period T10 and the period T11 as shown in FIG. 13, the time position of the period T11 including the drive pulses COM5 to COM7, which are different from the drive pulses COM1 to COM3 included in the period T10, may be controlled by using the drive signal COM in the period T10 as a reference. More specifically, in the case in which the viscous liquid is discharged from each nozzle while the head is moved at a constant speed, the positions at which the viscous liquid is discharged at each period can be changed by adjusting the time position of the period T11 with respect to the period T10. As a result, the viscous liquid can be discharged uniformly in a discharging area, which is advantageous in manufacturing high-precision color filters, microlenses, etc. Although a single cycle of the drive signal COM is used as an operational unit of discharging the viscous liquid in the example shown in FIGS. 12 and 13, a period including a plurality of cycles (for example, the period T10 and the period T11 shown in FIG. 13), may also be used as the operational unit of discharging the viscous liquid.

[First Example of the Discharge Device in Use]

Figure 14:
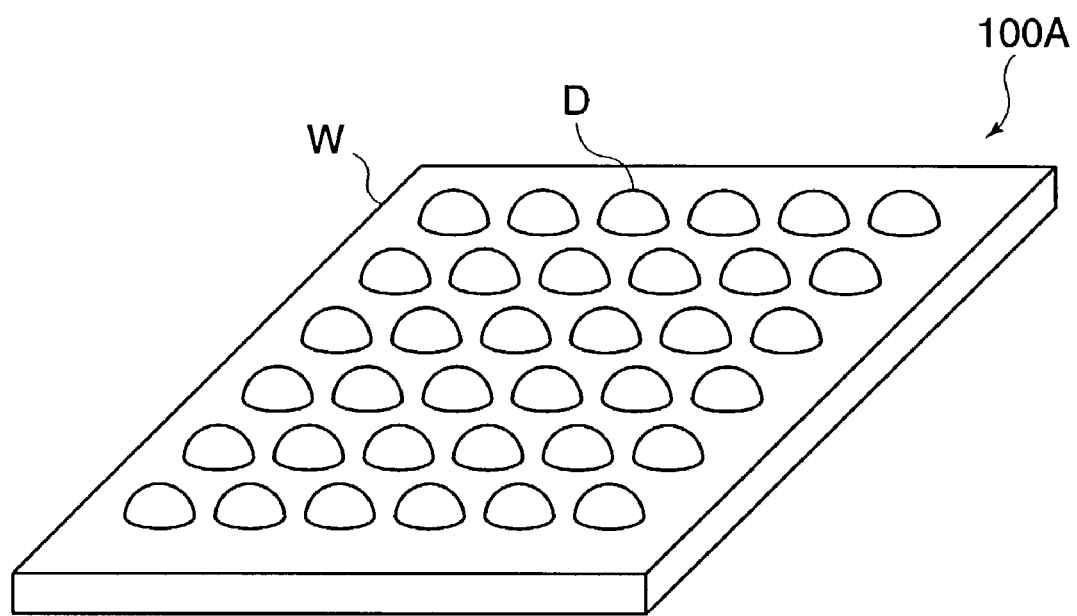
[FIG. 14]
Figure 15:
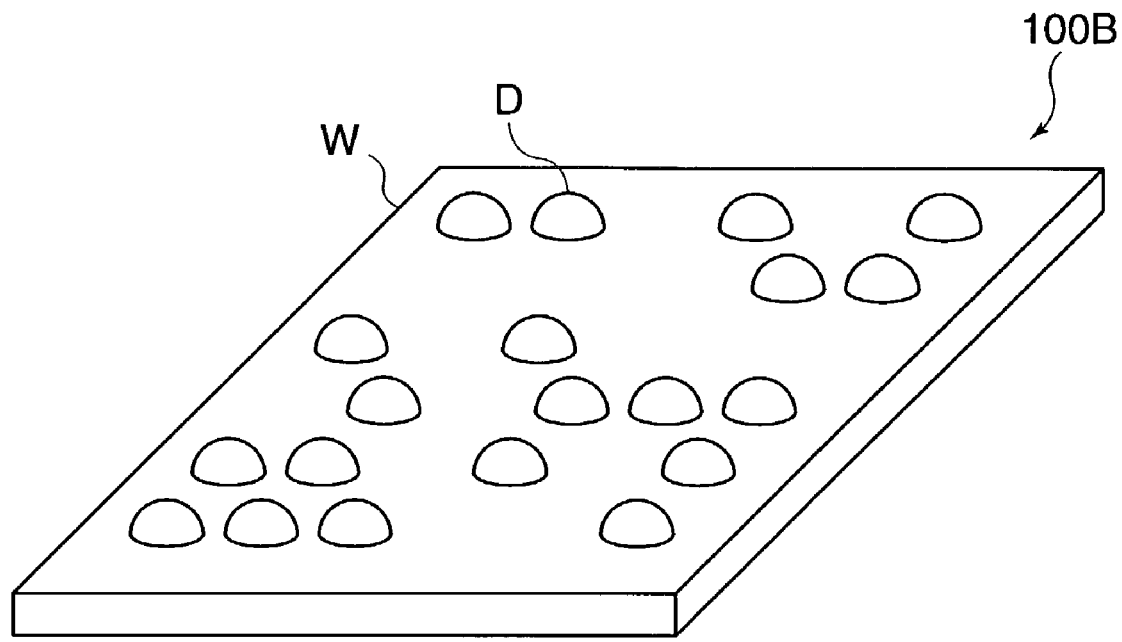
[FIG. 15]

FIGS. 14 and 15 are explanatory diagrams showing microlens arrays for optical interconnection devices which are formed by using the discharge device 1 shown in FIG. 1. In the discharge device 1, photosensitive transparent resin (viscous liquid) is discharged from the head 10 at predetermined positions on the target W, which is a transparent substrate shown in FIGS. 14 and 15. Then, the resin is cured by ultraviolet radiation, so that microlenses D having a predetermined size are formed at predetermined positions on the transparent substrate. Accordingly, microlens arrays 100A and 100B for optical interconnection devices are manufactured.

In the microlens array 100A shown in FIG. 14, the microlenses D are arranged along X and Y directions in a matrix pattern. In the microlens array 100B shown in FIG. 15, the microlenses D are arranged irregularly in the X and Y directions. Microlens arrays are used not only for optical interconnection devices but also for liquid crystal panels. Also in the case of manufacturing a microlens array for a liquid crystal panel, the efficiency in producing the microlens array can be increased by using the discharge device according to the present invention, since it is not necessary to use the photolithography techniques.

[Second Example of the Discharge Device in Use]

Figure 16:
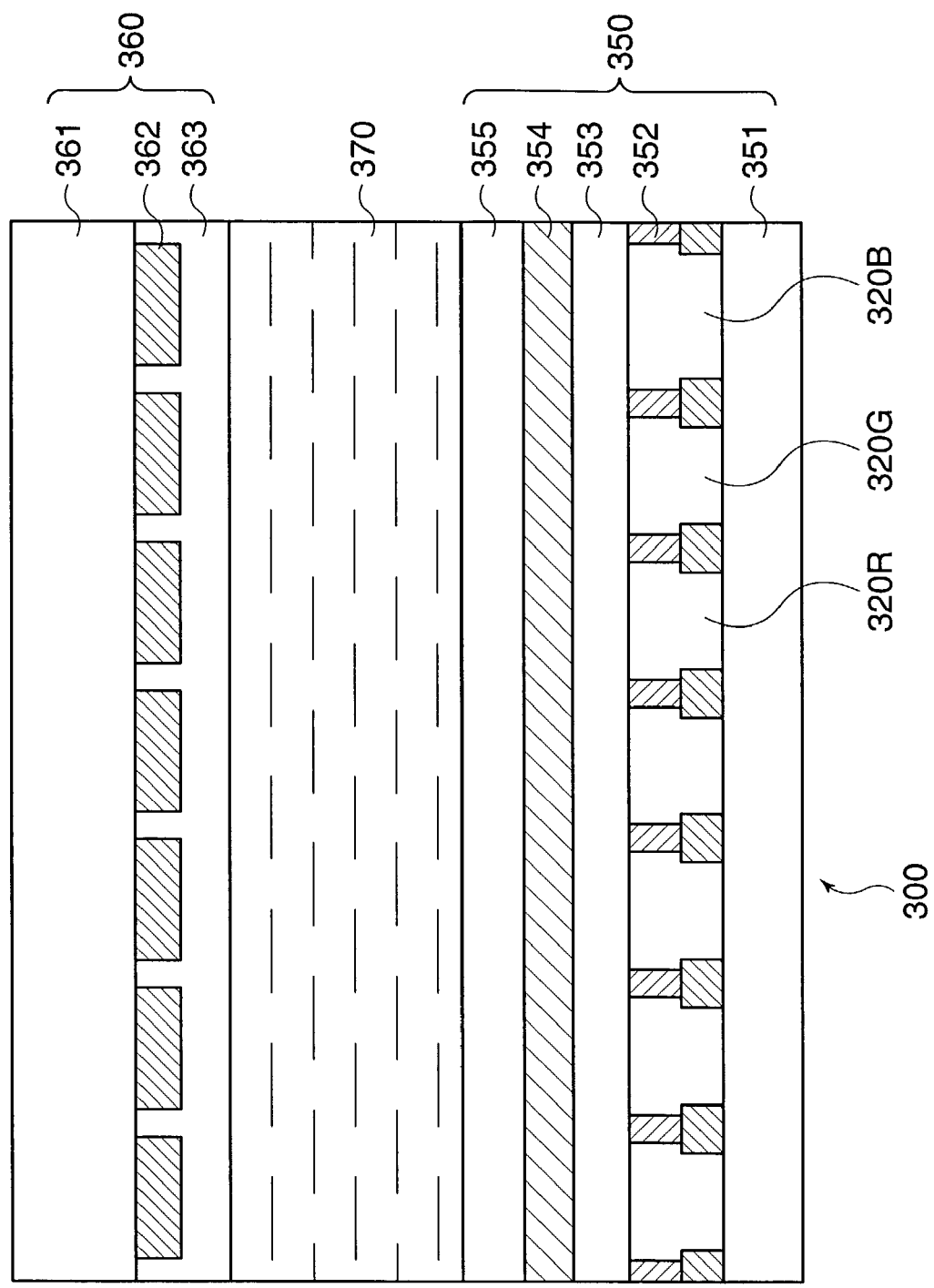
[FIG. 16]
Figure 17:
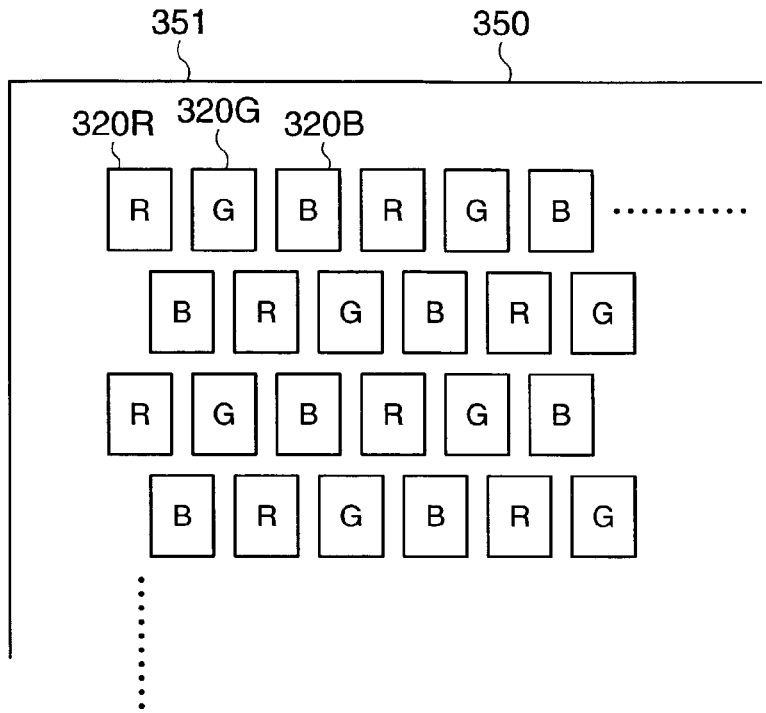
[FIG. 17] In FIGS. 17, (A) and (B) are explanatory diagrams showing examples of color configurations of the color filter substrate shown in FIG. 15.
Figure 17:
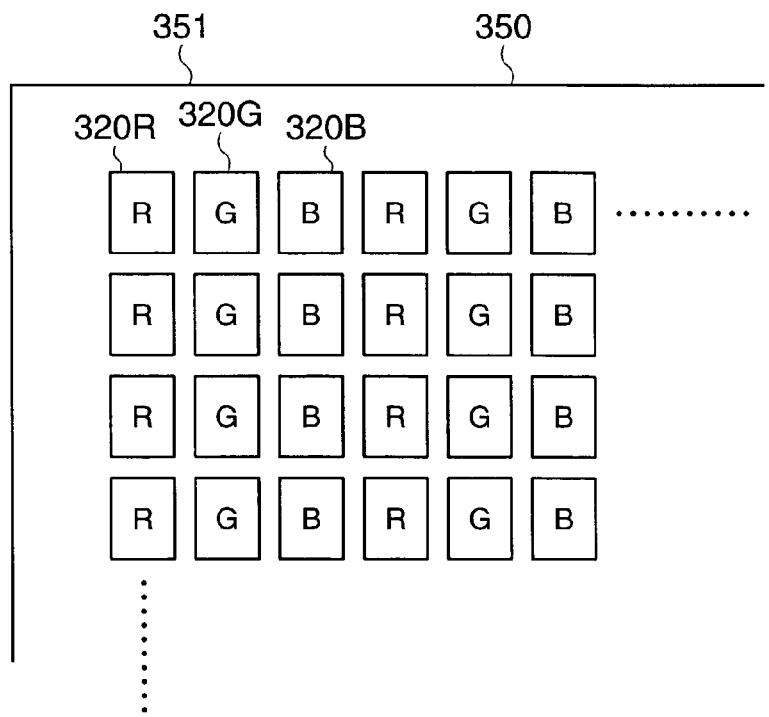

FIG. 16 is a schematic sectional view showing the construction of a liquid crystal device including a color filter substrate manufactured by using the discharge device 1 shown in FIG. 1. In addition, in FIGS. 17, (A) and (B) are explanatory diagrams showing examples of color configurations of the color filter substrate. With reference to FIG. 16, a liquid crystal device 300 includes a color filter substrate 350 and a TFT-array substrate 360 which are laminated with a predetermined gap therebetween, and liquid crystal 370, which is an electrooptic material, is injected and sealed between the two substrates. In the TFT-array substrate 360, TFTs (not shown) used for pixel switching and pixel electrodes 362 are arranged on the inner surface of a transparent substrate 361 in a matrix pattern, and an alignment film 363 is formed on the surfaces thereof. In addition, in the color filter substrate 350, color filter layers 320R, 320G, and 320B corresponding to R, G, and B, respectively, are formed on a transparent substrate 351 at positions such that the color filter layers 320R, 320G, and 320B oppose the pixel electrodes 362.

In the color filter substrate 350, the color filter layers 320R, 320G, and 320B are formed inside sections formed by single-step or multiple-step banks 352, and are arranged in a predetermined configuration such as the delta configuration shown in FIG. 17(A) and the striped configuration shown in FIG. 17(B).

In the manufacturing process of the color filter substrate 350, the banks 352 are first formed on the surface of the transparent substrate 351. Then, a resin of a predetermined color (viscous liquid) is supplied to the sections formed by the banks 352 by using the discharge device 1 described with reference to FIG. 1, and is cured by ultraviolet radiation or heat. In this manner, the color filter layers 320R, 320G, and 320B are formed. Since the filter elements 320R, 320G, and 320B are formed without using the photolithography techniques, the efficiency in producing the color filter substrate 350 is increased.

[Third Example of the Discharge Device in Use]

Figure 18:
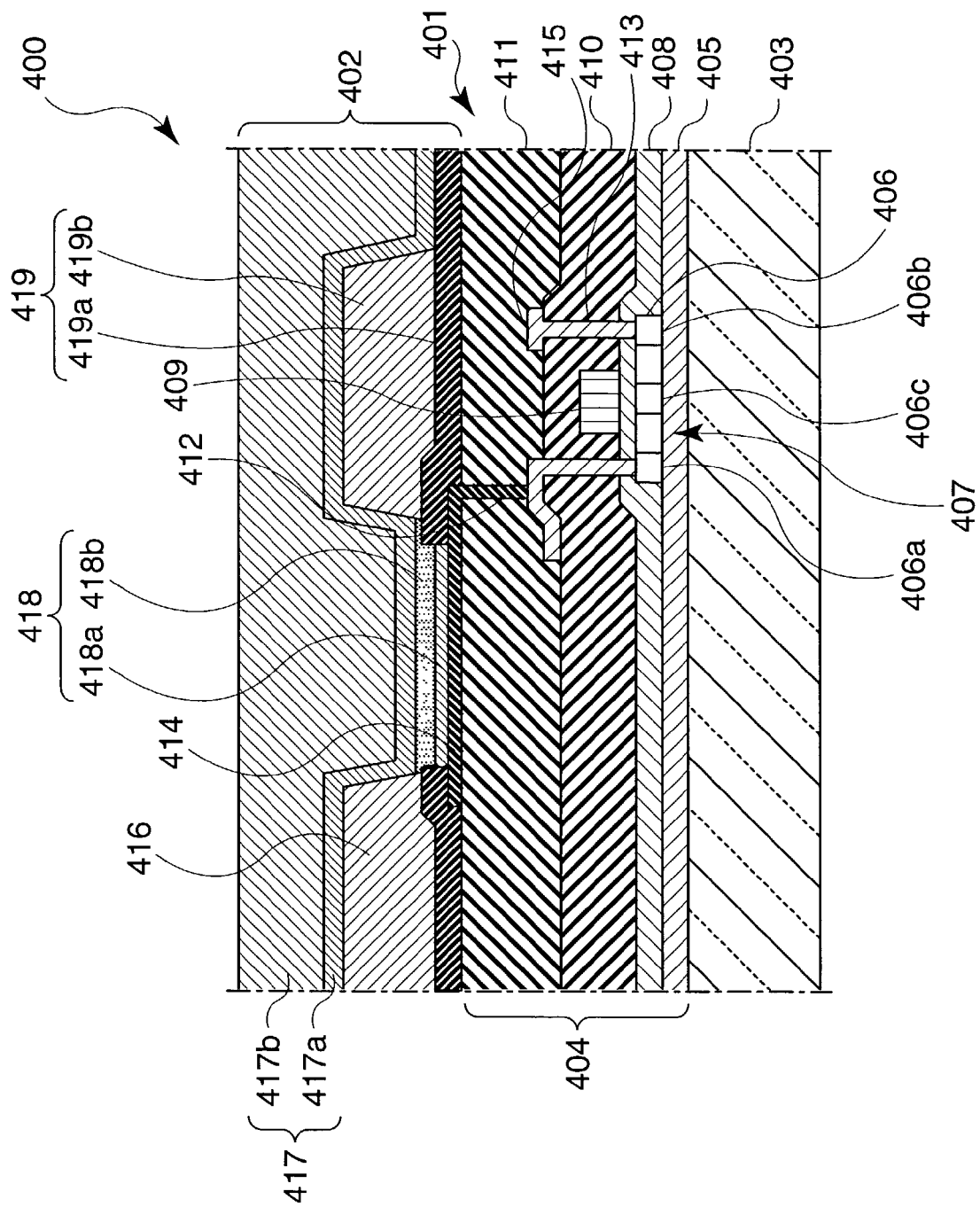
[FIG. 18]

FIG. 18 is a schematic sectional view showing the construction of an organic electroluminescent device forming each pixel in an organic electroluminescent display. In a light-emitting device 400 shown in FIG. 18, a display unit 412 is formed on a substrate 401, and a sealing member (not shown) is formed on the display unit 402. The substrate 401 is constructed by forming a circuit unit 404 on a transparent base 403 formed of glass, etc.

In the circuit unit 404, a bottom protecting film 405 formed of silicon oxide is disposed on the base 401 and a semiconductor film 406 formed of polysilicon is placed on the bottom protecting film 405 like an island. The circuit unit 404 includes a thin-film transistor 407 having a construction described below. The semiconductor film 406 includes a source region 406a and a drain region 406b formed by high-concentration P ion implantation, and a region where P ions are not implanted serves as a channel region 406c.

The circuit unit 404 includes a transparent gate-insulating film 408 which covers the bottom protecting film 405 and the semiconductor film 406, and a gate electrode 409 formed of Al, Mo, Ta, Ti, W, etc., is disposed on the gate-insulating film 408. In addition, a first interlayer insulating film 410 and a second interlayer insulating film 411 are formed on the gate electrode 409 and the gate-insulating film 408. The gate electrode 409 is placed at a position corresponding to the channel region 406c of the semiconductor film 406.

Contact holes 412 and 413 which are respectively connected to the source region 406a and the drain region 406b of the semiconductor film 406 are formed in the first and second interlayer insulating films 410 and 411, respectively. The contact hole 412 formed in the second interlayer insulating film 411 is connected to a pixel electrode 414 formed on the second interlayer insulating film 411. In addition, the contact hole 413 formed in the first interlayer insulating film 410 is connected to a power source line 415.

A display unit 402 includes a plurality of pixel electrodes 414, a light-emitting device 416 disposed on the pixel electrodes 414, and a cathode 417 (counter electrode) disposed on the light-emitting device 416. The pixel electrodes 414 are formed of, for example, ITO, and are formed in an approximately rectangular pattern in a plan view. The thickness of the pixel electrodes 414 is preferably in the range of 50 to 200 nm, and more preferably, the thickness thereof is set to approximately 150 nm. The light-emitting device 416 is mainly constructed of function layers 418 formed on the pixel electrodes 414 and a bank unit 419 which separates the function layers 418 from each other.

Each of the function layers 418 includes a hole injection/transport layer 418a laminated on the pixel electrode 414 and a light-emitting layer 418b formed on the hole injection/transport layer 418a. The function layers 418 are formed by using the discharge device according to the present invention. The hole injection/transport layer 418a is used for improving the characteristics of the light-emitting layer 418b such as the light-emitting efficiency and the life, and serves to inject electron holes into the light-emitting layer 418b and transport the electron holes in the light-emitting layer 418b. The hole-injection/transport layer 418a may be formed, for example, a mixture of polythiophene derivative such as polyethylene dioxythiophene and polystyrene sulfonate.

The light-emitting layer 418b emits light when the electron holes injected from the hole-injection/transport layer 418a and electrons injected from the cathode 417 are recombined. The light-emitting layers 418b include red light-emitting layers R, green light-emitting layers G, and blue light-emitting layers B. In addition, the light-emitting layers 418b may be formed of, for example, an organic light-emitting material such as tris(8-quinolinol) aluminum complex (Alq).

The inorganic bank unit 419 is constructed by laminating an inorganic bank layer 419a (first bank layer) positioned close to the substrate 401 and an organic bank layer 419b (second bank layer) positioned farther from the substrate 401. A part of the inorganic bank layer 419a and a part of the organic bank layer 419b are formed on the peripheral portion of the pixel electrode 414. More specifically, the inorganic bank layer 419a overlaps the peripheral portion of the pixel electrode 414 in a plan view, and the organic bank layer 419b also overlaps the peripheral portion of the pixel electrode 414 in a plan view. The inorganic bank layer 419a is formed such that it extends further toward the central region of the pixel electrode 414 than the organic bank layer 419b.

The inorganic bank layer 419a is preferably formed of an inorganic material such as $SiO_2$, $TiO_2$, etc. The thickness of the inorganic bank layer 419a is preferably in the range of 50 to 200 nm, and more preferably, the thickness thereof is set to approximately 150 nm. The organic bank layer 419b is preferably formed of a heat-resistant and solvent-resistant material such as acrylic resin and polyimide resin. The thickness of the organic bank layer 419b is preferably in the range of 0.1 to 3.5 µm, and more preferably, the thickness thereof is set to approximately 2 µm.

[Fourth Example of the Discharge Device in Use]

Figure 19:
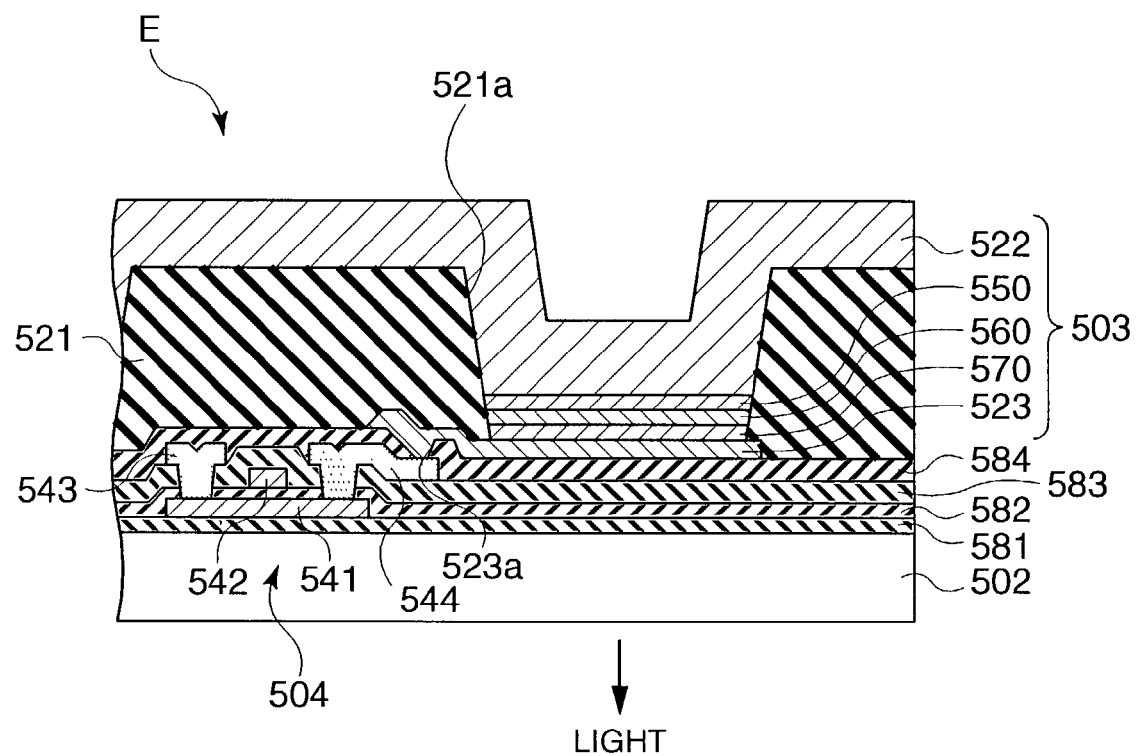
[FIG. 19]

FIG. 19 is a sectional view showing another construction of an organic electroluminescent device forming each pixel in an organic electroluminescent display. With reference to FIG. 19, in this organic EL display E, light is emitted at the side of a substrate 502, on which thin film transistors (TFT) are arranged.

The organic EL display E includes the substrate 502, and light-emitting devices (organic EL devices) 503 and TFTs 504 are provided on the substrate 502. The light-emitting device 503 includes a pixel electrode (anode) 523 formed of a transparent electrode material such as indium tin oxide (ITO), a hole-transport layer 570 which transports electron holes from the pixel electrode 523, an organic light-emitting layer 560 containing an organic light-emitting material, an electron-transport layer 550 provided on the organic light-emitting layer 560, and a counter electrode (cathode) 522 provided on the electron-transport layer 550 and formed of, for example, aluminum (Al), magnesium (Mg), gold (Au), silver (Ag), calcium (Ca), etc. The organic light-emitting layer 560, the hole-transport layer 570, etc., are formed by using the discharge device according to the present invention.

A bottom protecting layer 581 formed mainly of $SiO_2$ is provided on the substrate 502, and the TFT 504 is formed on the bottom protecting layer 581. The TFT 504 includes a silicon layer 541 formed on the bottom protecting layer 581; a gate insulating layer 582 provided on the bottom protecting layer 581 such that the gate insulating layer 582 covers the silicon layer 541; a gate electrode 542 disposed on the gate insulating layer 582 at a position such that the gate electrode 542 opposes the silicon layer 541; a first interlayer insulating layer 583 provided on the gate insulating layer 582 such that the first interlayer insulating layer 583 covers the gate electrode 542; a source electrode 543 which is connected to the silicon layer 541 via a contact hole formed in the gate insulating layer 582 and the first interlayer insulating layer 583; a drain electrode 544 which is placed at a position such that the drain electrode 544 opposes the source electrode 543 across the gate electrode 542 and which is connected to the silicon layer 541 via a contact hole formed in the gate insulating layer 582 and the first interlayer insulating layer 583, and a second interlayer insulating layer 584 provided on the first interlayer insulating layer 583 such that the second interlayer insulating layer 584 covers the source electrode 543 and the drain electrode 544.

The pixel electrode 523 is disposed on the top surface of the second interlayer insulating layer 584, and the pixel electrode 523 and the drain electrode 544 are connected to each other via a contact hole 523a formed in the second interlayer insulating layer 584. In addition, a bank layer 521 formed of synthetic resin, etc., is disposed between the second interlayer insulating layer 584 and the counter electrode 522 at an area excluding the area at which the light-emitting device (organic EL device) is formed.

A part of the silicon layer 541 which faces the gate electrode 542 across the gate insulating layer 582 serves as a channel region. In addition, the silicon layer 541 has a source region at the source side of the channel region and a drain region at the drain region of the channel region. The source region is connected to the source electrode 543 via the contact hole formed in the gate insulating layer 582 and the first interlayer insulating layer 583, and the drain region is connected to the drain electrode 544, which is formed in the same layer as the source electrode 543, via the contact hole formed through the gate insulating layer 582 and the first interlayer insulating layer 583. The pixel electrode 523 is connected to the drain region of the silicon layer 541 via the drain electrode 544.

In this example, since light is emitted at the side of the substrate 502 on which the TFT 504 is formed, the substrate 502 is preferably transparent or translucent. Accordingly, the substrate 502 is formed of glass, quartz, a resin having high transparency (that is, high light transmittance), etc.

The color of light may be changed by arranging a color filter, a color-conversion filter including luminous material, or a dielectric reflection filter.

The light-emitting layer may also emit light at the side opposite to the side of the substrate on which the TFT is formed. When the light is emitted at the side opposite to the side of the substrate, it is not necessary that the substrate 502 be transparent. In such a case, the substrate may be formed of ceramic such as alumina, a metal sheet formed of stainless steel, etc., which is subjected to insulation process such as surface oxidation, thermosetting resin, thermoplastic resin, etc.

The invention claimed is:

1. A discharge device for discharging viscous liquid toward a target, comprising:
    a head having a plurality of nozzles and a corresponding plurality of pressure-generating elements;
    a drive-signal generating device that generates a drive signal including a plurality of drive pulses;
    a control device that outputs waveform selection data defining which of the plurality of drive pulses is to be applied to the plurality of pressure-generating elements, the control device including a storage unit that stores nozzle data corresponding to variations in weight of the viscous liquid discharged from each of the plurality of nozzles when drive pulses having the same waveform are applied to corresponding pressure-generating elements, the control device generating and outputting waveform selection data on the basis of the nozzle data stored in the storage unit; and
    a switching device that selects predetermined drive pulses from the plurality of drive pulses and applies the selected drive pulses to the plurality of pressure-generating elements on the basis of the waveform selection data output by the control device.

2. The discharge device according to claim 1, different cycles of the drive signal including different drive pulses.

3. The discharge device according to claim 1, in the process of discharging the viscous liquid toward the target, a period including a plurality of cycles of the drive signal being set as an operational unit of discharging the viscous liquid.

4. The discharge device according to claim 2, in the process of discharging the viscous liquid toward the target, a time position of a specific cycle with respect to a specific first cycle of the drive signal being adjustable by using a single cycle of the drive signal as a unit.

5. The discharge device according to claim 1, in the process of discharging the viscous liquid toward the target, one of the pressure-generating elements receiving the drive pulse in a single cycle of the drive signal.

6. The discharge device according to claim 1, in the process of discharging the viscous liquid toward the target, one of the pressure-generating elements receiving the drive pulse in a plurality of cycles of the drive signal.

7. The discharge device according to claim 1,
    the plurality of drive pulses having waveforms to discharge the viscous liquid by different weights, and
    the switching device selecting one of the plurality of drive pulses on the basis of the waveform selection data and applying the selected drive pulse to a predetermined one of the pressure-generating elements.

8. The discharge device according to claim 1,
    the plurality of drive pulses having waveforms to discharge the viscous liquid by different weights, and
    the switching device selecting two or more of the plurality of drive pulses on the basis of the waveform selection data and applying the selected drive pulses to a predetermined one of the pressure-generating elements.

9. The discharge device according to claim 1, the plurality of nozzles being classified into a plurality of groups in accordance with the weights of the viscous liquid discharged when drive pulses having the same waveform are applied to the pressure-generating elements, and the result of the classification being stored in the storage unit as nozzle data.

10. The discharge device according to claim 1, the nozzle data being stored in the storage unit for each of the plurality of nozzles in accordance with the weights of the viscous liquid discharged when drive pulses having the same waveform are applied to the plurality of pressure-generating elements.

11. The discharge device according to claim 1,
    the head having the nozzle data regarding the plurality of nozzles formed in the head, and
    the nozzle data being input to the storage unit from a head testing device which measures the variation in weight.

12. A discharge method using the discharge device according to claim 1, comprising:
    discharging the viscous liquid onto the target at predetermined positions with the head.

13. A method for manufacturing a microlens array by using the discharge method according to claim 12, comprising:
    discharging a resin to form a plurality of microlenses, which serves as the viscous liquid, toward a substrate which serves as the target.

14. A method for manufacturing an electrooptic device by using the discharge method according to claim 12, comprising:
    discharging a resin to form a color filter, which serves as the viscous liquid, toward a substrate which serves as the target.

15. A method for manufacturing an electrooptic device by using the discharge method according to claim 12, comprising:
    discharging a liquid containing an electrooptic material, which serves as the viscous liquid, toward a substrate which serves as the target.

16. The method for manufacturing an electro optic device according to claim 15, the discharging including discharging electrooptic material that is a fluorescent organic compound to generate electroluminescence.

17. A method for controlling a discharge device that discharges viscous liquid, the discharge device including a head having a plurality of nozzles and a corresponding plurality of pressure-generating elements, the method comprising:
    discharging the viscous liquid from the plurality of nozzles of the discharge device by applying a first drive pulse to the plurality of pressure-generating elements;
    storing nozzle data corresponding to variations in weight of the viscous liquid discharged from the plurality of nozzles when drive pulses having the same waveform are applied to the plurality of pressure-generating elements; and correcting the first drive pulse applied to the plurality of nozzles, including generating and outputting waveform selection data on the basis of the stored nozzle data.

18. The method for controlling a discharge device according to claim 17, further comprising repeating the discharging, storing and correcting until the weight of the viscous liquid discharged from each of the plurality of nozzles of the discharge device becomes approximately uniform when drive pulses having the same waveform are applied to the plurality of pressure-generating elements.

* * * * *